US010733102B2

(12) United States Patent
Williams et al.

(10) Patent No.: US 10,733,102 B2
(45) Date of Patent: Aug. 4, 2020

(54) SELECTIVELY UPDATING A COHERENCE STATE IN RESPONSE TO A STORAGE UPDATE

(71) Applicant: INTERNATIONAL BUSINESS MACHINES CORPORATION, Armonk, NY (US)

(72) Inventors: Derek E. Williams, Round Rock, TX (US); Guy L. Guthrie, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 20 days.

(21) Appl. No.: 16/226,059

(22) Filed: Dec. 19, 2018

(65) Prior Publication Data
US 2020/0201765 A1 Jun. 25, 2020

(51) Int. Cl.
G06F 12/08 (2016.01)
G06F 12/0815 (2016.01)
G06F 12/0808 (2016.01)

(52) U.S. Cl.
CPC ...... G06F 12/0815 (2013.01); G06F 12/0808 (2013.01); G06F 2212/608 (2013.01)

(58) Field of Classification Search
CPC ............. G06F 12/0815; G06F 12/0808; G06F 12/0831; G06F 12/08; G06F 12/0817; G06F 12/0811; G06F 12/0875; G06F 12/0893; G06F 12/0864; G06F 12/0862; G06F 12/0833; G06F 9/3861; G06F 9/383; G06F 9/3824; G06F 9/3836; G06F 2212/608; G06F 2212/621; G06F 2212/507;
(Continued)

(56) References Cited

U.S. PATENT DOCUMENTS 5,490,261 A   2/1996 Bean et al.
5,544,345 A   8/1996 Carpenter et al.
(Continued)

OTHER PUBLICATIONS

Portland State University, IBM Power4 System Microarchitecture, ECE 588/688, 2009.
(Continued)

Primary Examiner — Mano Padmanabhan
Assistant Examiner — Jean C Edouard
(74) Attorney, Agent, or Firm — David Quinn; Brian F. Russell

(57) ABSTRACT

A processor core executes a first instruction indicating a first coherence state update policy that biases the cache memory to retain write authority, thereafter executes a second instruction indicating a second coherence state update policy that biases the cache memory to transfer write authority, and executes a store instruction following the first instruction in program order to generate a store request. A cache memory stores the cache line in association with a coherence state field set to a first modified coherence state. In response to the store request, the cache memory updates data of the cache line. If the store instruction is executed prior to the second instruction, the cache memory refrains from updating the coherence state field, but if the store instruction is executed after the second instruction, the cache memory updates the coherence state field from the first modified coherence state to a second modified coherence state.

20 Claims, 12 Drawing Sheets

(58) Field of Classification Search
CPC ..... G06F 2212/1032; G06F 2212/1024; G06F 2212/603; G06F 2212/60
USPC .......................................................... 711/146
See application file for complete search history.

(56) References Cited

U.S. PATENT DOCUMENTS

| | | | |
|---|---|---|---|
| 5,715,428 A | 2/1998 | Wang et al. | |
| 6,321,306 B1 | 11/2001 | Arimilli et al. | |
| 6,345,344 B1 | 2/2002 | Arimilli et al. | |
| 6,349,369 B1 | 2/2002 | Arimilli et al. | |
| 6,374,333 B1 | 4/2002 | Arimilli et al. | |
| 7,120,755 B2* | 10/2006 | Jamil | G06F 12/0831 711/141 |
| 7,269,717 B2 | 9/2007 | Tremblay et al. | |
| 2006/0179252 A1 | 8/2006 | Cantin et al. | |
| 2008/0086602 A1 | 4/2008 | Guthrie et al. | |
| 2008/0201534 A1* | 8/2008 | Guthrie | G06F 12/0831 711/149 |
| 2008/0301377 A1* | 12/2008 | Guthrie | G06F 12/0831 711/146 |
| 2009/0019230 A1* | 1/2009 | Colglazier | G06F 12/0815 711/141 |
| 2009/0019233 A1* | 1/2009 | Colglazier | G06F 12/0822 711/141 |
| 2010/0023695 A1* | 1/2010 | Guthrie | G06F 12/0817 711/122 |
| 2010/0100683 A1* | 4/2010 | Guthrie | G06F 12/0862 711/122 |
| 2010/0153647 A1 | 6/2010 | Guthrie et al. | |
| 2010/0153650 A1* | 6/2010 | Guthrie | G06F 12/0817 711/133 |
| 2010/0262786 A1* | 10/2010 | Cummings | G06F 12/0815 711/141 |
| 2011/0276763 A1* | 11/2011 | Daly | G06F 12/0888 711/122 |
| 2017/0293559 A1* | 10/2017 | Guthrie | G06F 12/0831 |
| 2018/0136849 A1* | 5/2018 | Shirota | G06F 3/0688 |

OTHER PUBLICATIONS

Williams, Derek et al., U.S. Appl. No. 16/226,086, filed Dec. 19, 2018, Notice of Allowance dated Mar. 2, 2020.
Williams, Derek et al., U.S. Appl. No. 16/226,018, filed Dec. 19, 2018, Notice of Allowance dated Feb. 5, 2020.

* cited by examiner

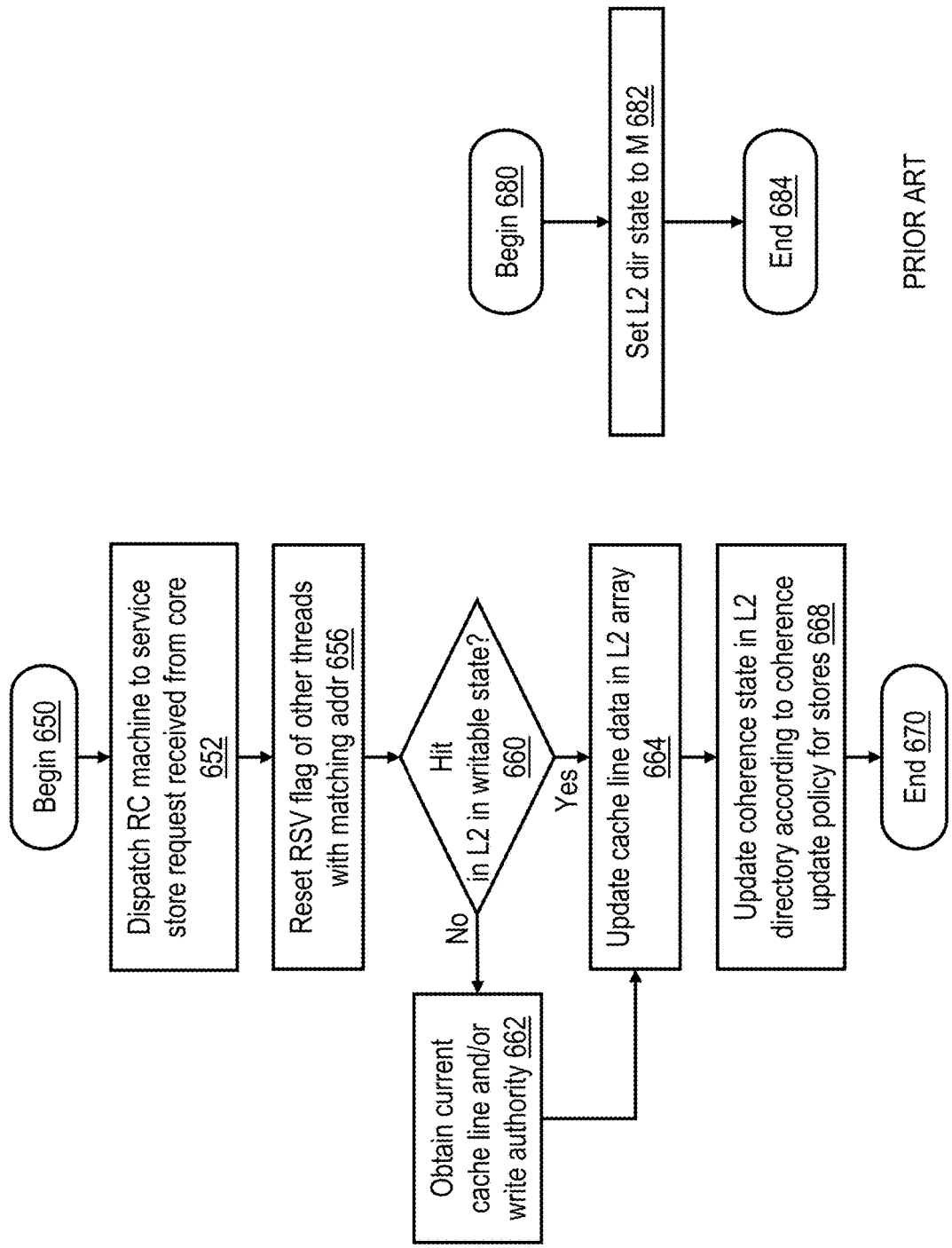

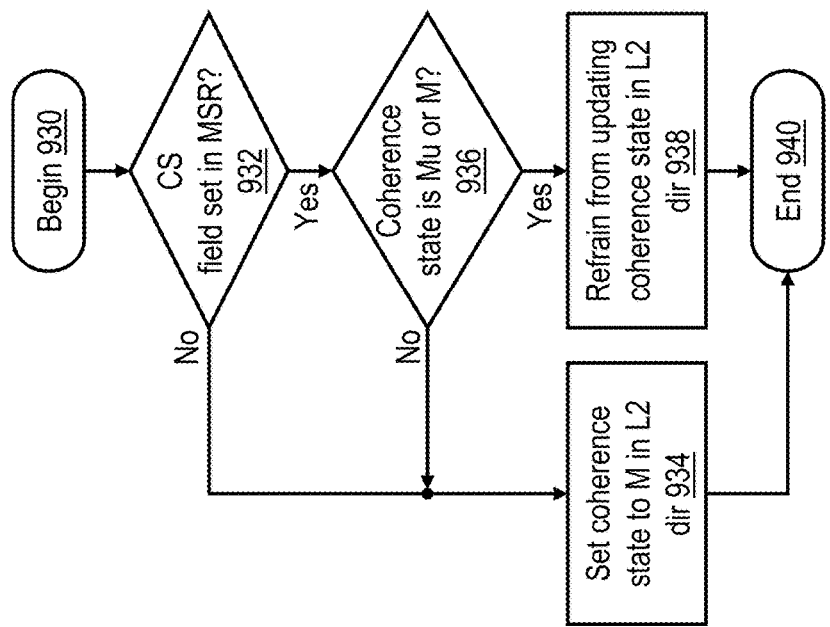
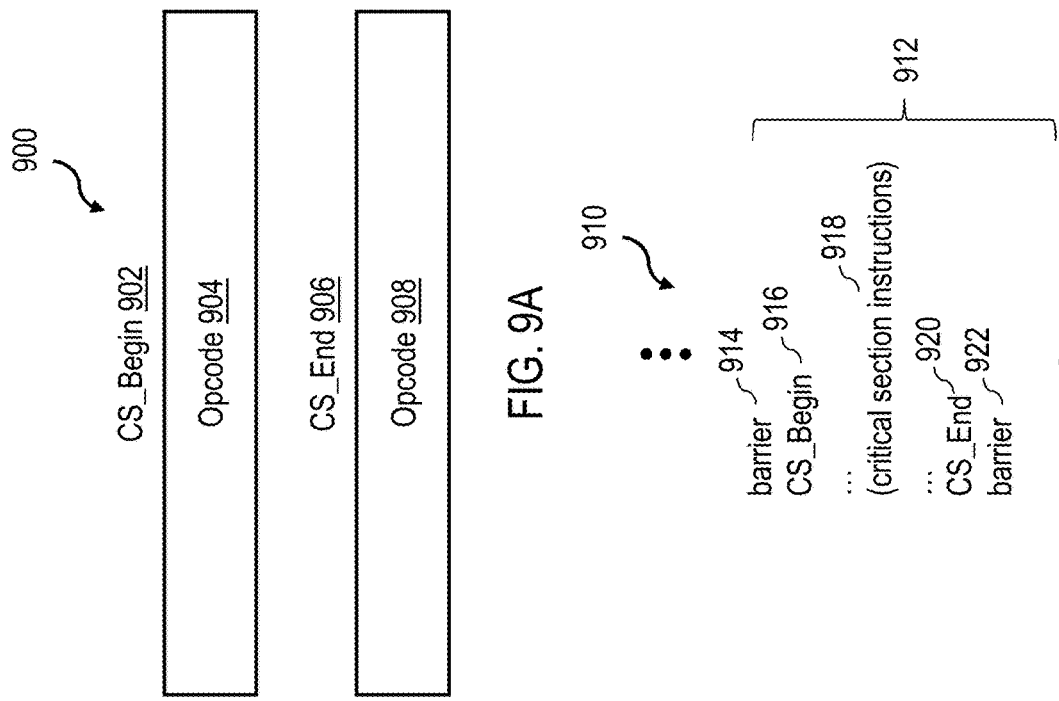
FIG. 9C
FIG. 9A
FIG. 9B

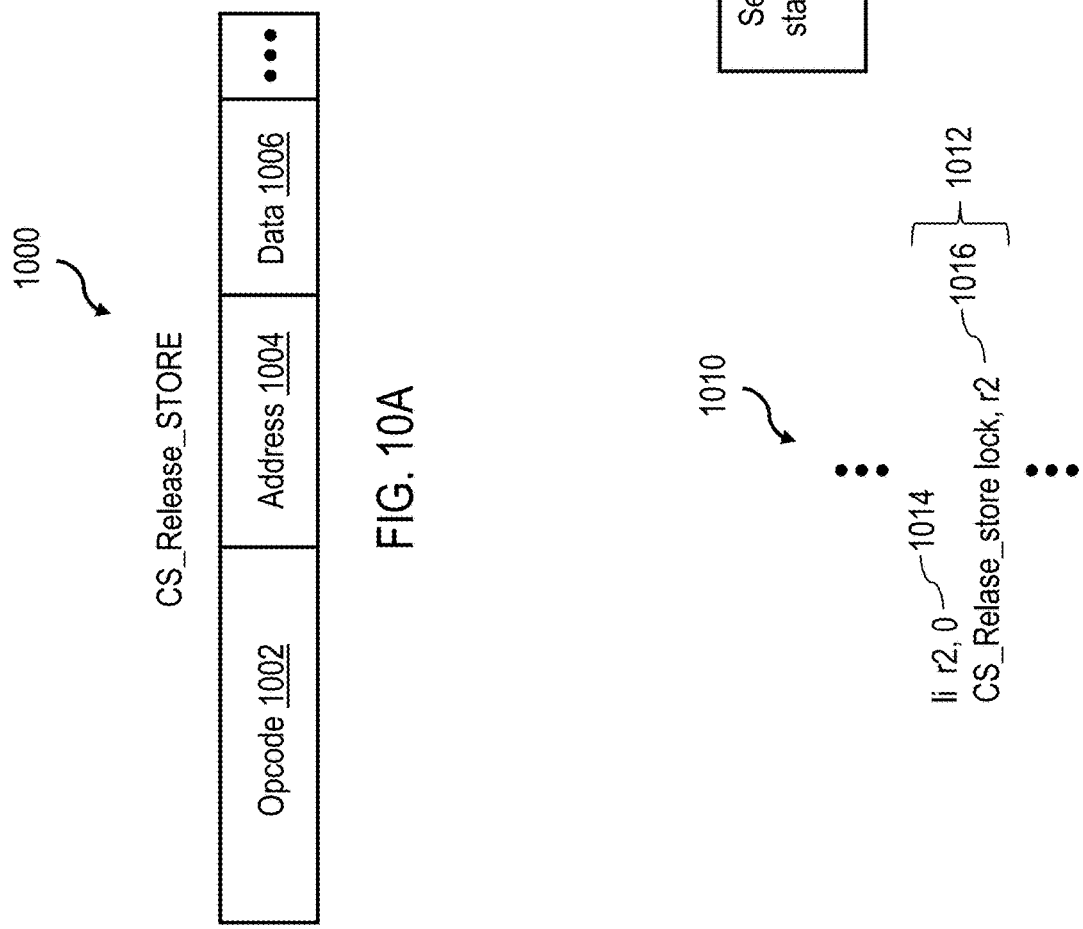

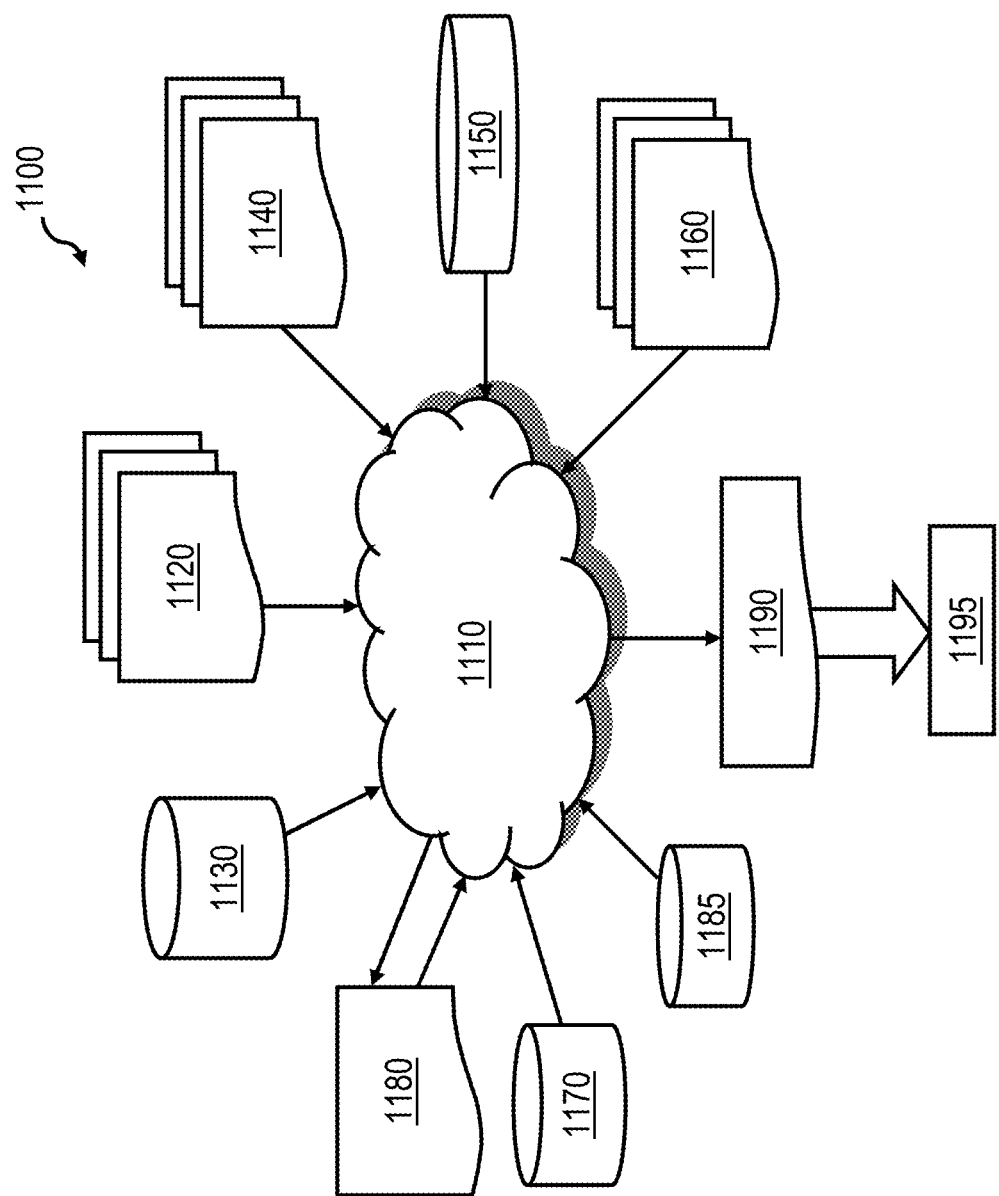

SELECTIVELY UPDATING A COHERENCE STATE IN RESPONSE TO A STORAGE UPDATE

BACKGROUND OF THE INVENTION

The present invention relates in general to data processing system and, in particular, to managing accesses to data in the shared memory of a data processing system. Still more particularly, the present invention relates to selectively updating a coherence state in response to a storage update.

A conventional symmetric multiprocessor (SMP) computer system, such as a server computer system, includes multiple processing units all coupled to a system interconnect, which typically comprises one or more address, data, and control buses. Coupled to the system interconnect is a system memory, which represents the lowest level of shared memory in the multiprocessor computer system and which generally is accessible for read and write access by all processing units. In order to reduce access latency to instructions and data residing in the system memory, each processing unit is typically further supported by a respective multi-level vertical cache hierarchy, the lower level(s) of which may be shared by one or more processor cores.

Because multiple processor cores may request write access to a same memory block (e.g., cache line or sector) and because cached memory blocks that are modified are not immediately synchronized with system memory, the cache hierarchies of multiprocessor computer systems typically implement a cache coherence protocol to ensure at least a minimum required level of coherence among the various processor core's "views" of the contents of system memory. The minimum required level of coherence is determined by the selected memory consistency model, which defines rules for the apparent ordering and visibility of updates to the distributed shared memory. In all memory consistency models in the continuum between weak consistency models and strong consistency models, cache coherency requires, at a minimum, that after a processing unit accesses a copy of a memory block and subsequently accesses an updated copy of the memory block, the processing unit cannot again access the old ("stale") copy of the memory block.

A cache coherence protocol typically defines a set of coherence states stored in association with cached copies of memory blocks, as well as the events triggering transitions between the coherence states and the coherence states to which transitions are made. Coherence protocols can generally be classified as directory-based or snoop-based protocols. In directory-based coherence protocols, a common central directory maintains coherence by controlling accesses to memory blocks by the caches and by updating or invalidating copies of the memory blocks held in the various caches. Snoop-based coherence protocols, on the other hand, implement a distributed design paradigm in which each cache maintains a private directory of its contents, monitors ("snoops") the system interconnect for memory access requests targeting memory blocks held in the cache, and responds to the memory access requests by updating its private directory, and if required, by transmitting coherence message(s) and/or its copy of the memory block.

The cache states of the coherence protocol can include, for example, those of the well-known MESI (Modified, Exclusive, Shared, Invalid) protocol or a variant thereof. The MESI protocol allows a cache line of data to be associated with one of four states: "M" (Modified), "E" (Exclusive), "S" (Shared), or "I" (Invalid). The Modified state indicates that a memory block is valid only in the cache holding the Modified memory block and that the memory block is not consistent with system memory. The Exclusive state indicates that the associated memory block is consistent with system memory and that the associated cache is the only cache in the data processing system that holds the associated memory block. The Shared state indicates that the associated memory block is resident in the associated cache and possibly one or more other caches and that all of the copies of the memory block are consistent with system memory. Finally, the Invalid state indicates that the data and address tag associated with a coherency granule are both invalid.

In snoop-based coherence protocols, it is common for caches to respond to a request snooped on the interconnect by providing an individual coherence response. These individual coherence responses are then combined or otherwise processed to determine a final systemwide coherence response for the request, which can indicate, for example, whether or not the request will be permitted to succeed or will have to be retried, a data source responsible for supplying to the requesting cache a target cache line of data identified in the request, a coherence state of the target cache line at one or more caches following the request, etc.

BRIEF SUMMARY

According to at least one embodiment, a processor core executes a first instruction indicating a first coherence state update policy that biases the cache memory to retain write authority, thereafter executes a second instruction indicating a second coherence state update policy that biases the cache memory to transfer write authority, and executes a store instruction following the first instruction in program order to generate a store request. A cache memory stores the cache line in association with a coherence state field set to a first modified coherence state. In response to the store request, the cache memory updates data of the cache line. If the store instruction is executed prior to the second instruction, the cache memory refrains from updating the coherence state field, but if the store instruction is executed after the second instruction, the cache memory updates the coherence state field from the first modified coherence state to a second modified coherence state.

BRIEF DESCRIPTION OF THE SEVERAL VIEWS OF THE DRAWINGS

FIG. 6B is a high level logical flowchart of an exemplary method of processing a store request in lower level cache in accordance with one embodiment;

FIG. 6C is a high level logical flowchart of a prior art method of updating a coherence state of a cache line according to a coherence state update policy for stores;

FIG. 9A illustrates exemplary critical section begin and critical section end instructions that, in accordance with a second embodiment, can be utilized to demarcate the beginning and end, respectively, of a critical section of a multi-threaded program;

FIG. 9B depicts an exemplary program including a critical section demarcated by critical section begin and critical section end instructions in accordance with the second embodiment;

FIG. 9C is a high level logical flowchart of an exemplary method of selectively updating a coherence state of a target cache line of a store request in accordance with the second embodiment;

FIG. 10A illustrates an exemplary critical section store instruction that, in accordance with a third embodiment, can be utilized to specify a desired coherence state update for a target cache line;

FIG. 10B depicts an exemplary program including a lock release sequence including a critical section store instruction in accordance with the third embodiment;

FIG. 10C is a high level logical flowchart of an exemplary method of updating a coherence state of a target cache line of a store request in accordance with the third embodiment; and FIG. 11 is a block diagram of an exemplary design flow.

DETAILED DESCRIPTION

Figure 1:
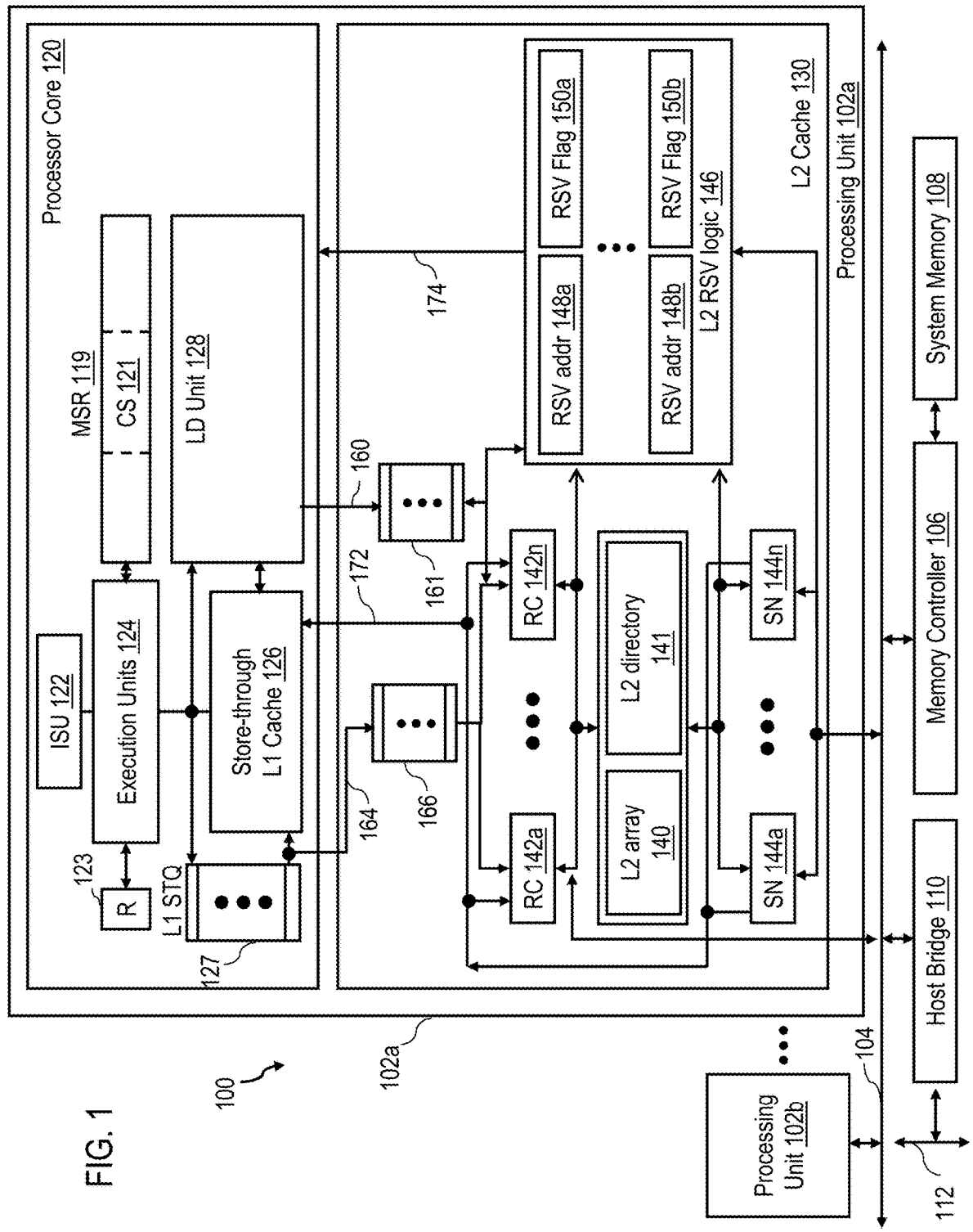
FIG. 1 is a high level block diagram of an illustrative data processing system in accordance with one embodiment.

With reference now to the figures and in particular with reference to FIG. 1, there is illustrated a high level block diagram of a data processing system 100 in accordance with one embodiment. As shown, data processing system 100 includes multiple processing units 102 (including at least processing units 102a-102b) for processing data and instructions. Processing units 102 are coupled for communication to a system interconnect 104 for conveying address, data and control information between attached devices. In the depicted embodiment, these attached devices include not only processing units 102, but also a memory controller 106 providing an interface to a shared system memory 108 and one or more host bridges 110, each providing an interface to a respective mezzanine bus 112. Mezzanine bus 112 in turn provides slots for the attachment of additional unillustrated devices, which may include network interface cards, I/O adapters, non-volatile memory, non-volatile storage device adapters, additional bus bridges, etc.

As further illustrated in FIG. 1, each processing unit 102, which may be realized as a single integrated circuit, includes one or more processor cores 120 (of which only one is explicitly shown) for processing instructions and data. Each processor core 120 includes an instruction sequencing unit (ISU) 122 for fetching and ordering instructions for execution and one or more execution units 124 for executing instructions dispatched from ISU 122. In at least some embodiments, execution units 124 are capable of executing instructions from multiple simultaneous hardware threads of execution. The instructions executed by execution units 124 include memory access instructions, such as various types of load and store instructions, which generate memory access requests that cause data to be retrieved from the shared memory system into registers 123 or to be stored from registers 123 to the shared memory system.

It is important to note that the present application makes a distinction between "instructions", such as load and store instructions, and "requests." Load and store "instructions" are defined herein as inputs to an execution unit that include an request code (opcode) identifying the type of instruction and one or more operands specifying data to be accessed and/or its address. Load and store "requests" are defined herein as data and/or signals generated following instruction execution that specify at least the target address of data to be accessed. Thus, load and store requests may be transmitted from a processor core 120 to the shared memory system to initiate data accesses, while load and store instructions are not.

Each processor core 120 further includes an L1 store queue (STQ) 127 and a load unit 128 for managing the completion of store and load requests, respectively, corresponding to executed store and load instructions. In a preferred embodiment, L1 STQ 127 is implemented as a First-In, First-Out (FIFO) queue containing a plurality of queue entries. Store requests are accordingly loaded in the "top" entry of L1 STQ 127 at execution of the corresponding store instruction to determine the target address, and are issued to L2 cache 130 when the store request reaches the "bottom" or "commit" entry of L1 STQ 127.

The state of processor core 120 is reported and controlled by a software-accessible machine state register (MSR) 119. MSR 119 includes multiple fields, which may control, among other things, interrupt modes, tracing modes, use of little-Endian or big-Endian bit ordering, etc. In at least one embodiment, MSR 119 includes a critical section flag 121, which can be utilized to control coherence state updates following storage updates, as discussed further below with reference to FIGS. 9A-9C.

The operation of processor core 120 is supported by a multi-level volatile memory hierarchy having, at its lowest level, shared system memory 108, and at its upper levels two or more levels of cache memory, which in the illustrative embodiment include a L1 cache 126 and a L2 cache 130. As in other shared memory multiprocessor data processing systems, the contents of the memory hierarchy may generally be accessed and modified by threads of execution executing in any processor core 120 in any processing unit 102 of data processing system 100.

In accordance with one embodiment, L1 cache 126, which may include bifurcated L1 data and instruction caches, is implemented as a store-through cache, meaning that the point of cache coherency with respect to other processor cores 120 is located below L1 cache 126 and, in the depicted embodiment, is located at store-in L2 cache 130. Accordingly, as described above, L1 cache 126 does not maintain true cache coherency states (e.g., Modified, Exclusive, Shared, Invalid or the like) for its cache lines, but only maintains valid/invalid bits. Because L1 cache 126 is implemented as a store-through cache, store requests first complete relative to the associated processor core 120 in L1 cache 126 and then complete relative to other processing units 102 at a point of system-wide coherency, which in the depicted embodiment is L2 cache 130.

As further illustrated in FIG. 1, L2 cache 130 contains a L2 array 140 that stores cache lines of instructions and data and an associated L2 directory 141 of the contents of L2 array 140. Assuming L2 array 140 and L2 directory 141 are set associative as is conventional, storage locations in system memories 108 are mapped to particular congruence classes within L2 array 140 utilizing predetermined index bits within the system memory (real) addresses. The particular memory blocks stored within the cache lines of L2 array 140 are recorded in L2 directory 141, which contains one directory entry for each cache line in L2 array 140. While not expressly depicted in FIG. 1, it will be understood by those skilled in the art that each directory entry in L2 directory 141 includes various fields, for example, a tag field that identifies the real address of the memory block held in the corresponding cache line of L2 array 140, a state field that indicates the coherence state of the cache line, a replacement order (e.g., Least Recently Used (LRU)) field indicating a replacement order for the cache line with respect to other cache lines in the same congruence class, and inclusivity bits indicating whether the memory block is held in the associated L1 cache 126.

L2 cache 230 includes an L2 store queue (STQ) 166 that receives storage-modifying requests and synchronization (barrier) requests from L1 STQ 127 via bus 164 and buffers such requests. L2 cache 230 similarly includes a L2 load queue (LDQ) 161 that receives load requests from load unit 128 via bus 160 and buffers such requests. In order to service the requests buffered in L2 STQ 166 and L2 LDQ 161, L2 cache 230 implements multiple Read-Claim (RC) machines 142a-142n, which are each capable of independently and concurrently servicing a request dispatched from one of queues 166 and 161. In order to service remote requests originating from processor cores 200 other than the affiliated processor core 200, L2 cache 230 also includes multiple L2 snoop (SN) machines 144a-144n. Each snoop machine 144 can independently and concurrently handle a remote request snooped from system interconnect 104. As will be appreciated, the servicing of memory access requests by RC machines 142 may require the replacement or invalidation of memory blocks within L2 array 140 (and L1 cache 126). Accordingly, L2 cache 130 may also additionally include unillustrated CO (castout) machines that manage the removal and writeback of memory blocks from L2 array 140.

L2 cache 130 finally includes reservation logic 146 for recording reservations of the associated processor core 120. Specifically, in the illustrated embodiment, reservation logic 146 includes, for each thread that may be concurrently executed by the associated processor core 120, a respective reservation register comprising a reservation address field 148 and a reservation flag 150. In the depicted example, which assumes that processor core 120 can each execute two concurrent hardware threads, reservation logic 146 includes two reservation registers: reservation address field 148a and reservation flag 150a for thread 0 and reservation address field 148b and reservation flag 150b for thread 1. When set (e.g., to '1'), a reservation flag 150 indicates that the corresponding thread holds a reservation for the address contained in the associated reservation address field 148 and otherwise indicates no reservation is held. Reservation logic 146 supplies pass/fail indications indicating the success or failure of store-conditional (STCX) requests to processor cores 120 via pass/fail bus 174.

Reservation logic 146 is intended to support the operation of so-called load-reserve (LARX) and store-conditional (STCX) instructions. These instructions provide the ability to atomically update memory locations. The load-reserve instruction attempts to load the current value of the memory location and initiates tracking of the location to monitor for any updates to the location. If the current value is not obtained, the subsequent store conditional instruction fails. Otherwise, the store-conditional instruction will successfully write the memory location only if no intervening writes to the memory location have occurred between the load-reserve instruction and the store-conditional instruction. In this manner, the combined action of the load-reserve and store-conditional instructions provides an atomic read-modify-write of a memory location.

Those skilled in the art will additionally appreciate that data processing system 100 of FIG. 1 can include many additional non-illustrated components, such as interconnect bridges, non-volatile storage, ports for connection to networks or attached devices, etc. Because such additional components are not necessary for an understanding of the described embodiments, they are not illustrated in FIG. 1 or discussed further herein. It should also be understood, however, that the enhancements described herein are applicable to cache coherent data processing systems of diverse architectures and are in no way limited to the generalized data processing system architecture illustrated in FIG. 1.

In exemplary data processing system 100 of FIG. 1, an interconnect operation begins when a master of the operation (e.g., a RC machine 142 of an L2 cache 130) broadcasts a request on system interconnect 104. The request preferably includes at least a transaction type indicating a type of desired access and a resource identifier (e.g., target real address) indicating a resource to be accessed by the request. Common types of requests include those set forth below in Table I.

TABLE I

| Request | Description |
| --- | --- |
| CASTOUT | Copies the image of a memory block from a higher level of memory to a lower level of memory in preparation for the destruction of the higher level copy |
| DCLAIM (Data Claim) | Requests authority to promote an existing read-only copy of a memory block to a unique copy with write authority and with the intent to update (modify) it, invalidating any other cached copies of the memory block |
| DCBZ (Data Cache Block Zero) | Requests authority to create, in cache, a new unique copy of a memory block with write authority containing all zeros, invalidating any other cached copies of the memory block |
| DCBFZ (Data Cache Block Flush and Zero) | Requests authority to create, in system memory, a new unique copy of a memory block containing all zeros, invalidating any other cached copies of the memory block |
| READ | Requests a copy of the image of a memory block with read permission |
| RWITM (Read-With-Intent-To-Modify) | Requests a unique copy of the image of a memory block with write authority to update (modify) it, invalidating any other cached copies of the memory block |
| WRITE | Requests authority to write a new unique copy of a memory block to main memory and invalidate any other cached copies of the memory block |

The request is received (snooped) by coherence participants (e.g., L2 caches 130 and memory controllers 106) distributed throughout data processing system 100. In general, with some exceptions L2 SN machines 144 in the same L2 cache 130 as the master of a request do not snoop the request (i.e., there is generally no self-snooping) because a request is transmitted on the interconnect fabric only if the request cannot be serviced internally by a processing unit 102. Snoopers that receive and process requests may each provide a respective partial response (Presp) representing the response of at least that snooper to the request. A memory controller 106 determines the partial response to provide based, for example, upon whether the memory controller 106 is responsible for the request address and whether it has resources available to service the request. An L2 cache 130 may determine its partial response based on, for example, the availability of a L2 SN machine 144 to handle the request, the availability of its L2 directory 141, and the coherence state associated with the target real address in L2 directory 141.

The partial responses of various snoopers are logically combined either in stages or all at once by one or more instances of unillustrated response logic to determine a system-wide combined response (Cresp) to the request. Response logic provides the combined response to the master and snoopers via the interconnect fabric to indicate the system-wide coherence response (e.g., success, failure, retry, etc.) for the request. If the combined response indicates success of the request, the combined response may indicate, for example, a data source for a target memory block of the request, a coherence state in which the target memory block is to be cached by the master (or other caches), and whether "cleanup" operations invalidating the requested memory block in one or more caches are required.

In response to receipt of the combined response, one or more of the master and snoopers typically perform one or more additional actions in order to service the request. These additional actions may include supplying data to the master, invalidating or otherwise updating the coherence state of data cached in one or more L1 caches 126 and/or L2 caches 130, performing castout operations, writing back data to a system memory 108, etc. If required by the request, a requested or target memory block may be transmitted to or from the master before or after the generation of the combined response by the response logic.

The partial response of a snooper to a request and the actions performed by the snooper in response to the request and/or its combined response may be described with reference to whether that snooper is a Highest Point of Coherency (HPC), a Lowest Point of Coherency (LPC), or neither with respect to the request (target) address specified by the request. An LPC is defined herein as a memory device or I/O device that serves as the repository for a memory block. In the absence of a HPC for the memory block, the LPC holds the true image of the memory block and has authority to grant or deny requests to generate an additional cached copy of the memory block. For a typical request in the data processing system embodiment of FIG. 1, the LPC will be the memory controller 106 for the system memory 108 holding the referenced memory block. An HPC is defined herein as a uniquely identified device that caches a true image of the memory block (which may or may not be consistent with the corresponding memory block at the LPC) and has the authority to grant or deny a request to modify the memory block. Descriptively, the HPC may also provide a copy of the memory block to a requestor in response to an operation that does not modify the memory block. Thus, for a typical request in the data processing system embodiment of FIG. 1, the HPC, if any, will be a particular L2 cache 130. Although other indicators may be utilized to designate an HPC for a memory block, a preferred embodiment of the present invention designates the HPC, if any, for a memory block utilizing selected cache coherence state(s) within the L2 directory 141 of an L2 cache 130.

The HPC, if any, for a memory block referenced in a request, or in the absence of an HPC, the LPC of the memory block, preferably has the responsibility of protecting the transfer of coherence ownership of a memory block, if necessary, in response to a request. This protective function can be performed by providing retry (RTY) partial responses to other requests specifying the same target address until the coherence ownership of the target memory block is transferred.

The snoop-based coherence protocol implemented by data processing system 100 preferably specifies a set of coherence states for cache lines held in L2 caches 130 that promotes intelligent transfer of write authority between L2 caches 130 for cache lines subject to update by multiple concurrent hardware threads of execution. In a preferred embodiment, the coherence states within the coherence protocol, in addition to providing (1) an indication of whether a cache is the HPC for a memory block, also indicate (2) whether the cached copy is unique (i.e., is the only cached copy system-wide), (3) whether and when the cache can serve as a data source and provide a copy of the memory block to a master of a request for the memory block, (4) whether the cache block is "sticky" (i.e. whether the cache state maintains HPC authority when servicing a read operation), and (5) whether the cached image of the memory block is consistent with the corresponding memory block at the LPC (system memory). These four attributes can be expressed, for example, in an exemplary variant of the well-known MESI (Modified, Exclusive, Shared, Invalid) protocol that includes at least the coherence states summarized below in Table II.

TABLE II

| Cache state | HPC? | Unique? | Data source? | Sticky? | Consistent with LPC? | Legal concurrent states |
|---|---|---|---|---|---|---|
| M | Yes | Yes | Yes | No | Yes | I (& LPC) |
| Mu | Yes | Yes | Yes | Yes | No | I (& LPC) |
| Me | Yes | Yes | Yes | Yes | No | I (& LPC) |
| T | Yes | Unknown | Yes | N/A | No | S, I (& LPC) |
| Te | Yes | Unknown | Yes | N/A | Yes | S, I (& LPC) |
| S | No | Unknown | No | N/A | Unknown | T, S, I (& LPC) |
| I | No | N/a | No | N/A | N/a | M, Me, Mu, T, Te, S, I, (& LPC) |

This exemplary set of coherence states includes three distinct M-type coherence states. The first of these, referred to herein as the M state, is typically assigned to a cache line as the result of a store instruction updating the cache line. As a result of a store, the cache line will be modified relative to the main memory, and all other cached copies of the line will be invalidated, making this cached copy of the cache line unique. In prior systems, if cache holding a cache line in the M state snooped a read operation targeting the cache line, the cache would transition its copy of the cache line from the M state to the T state and provide an S copy of the cache line to the requesting cache. Unfortunately, if the processor core associated with the requesting cache then executed a store instruction to update the cache line, the requesting cache would need to again communicate with the cache holding the cache line in the T state to obtain permission to complete the update. This additional communication between the caches reduces performance and dissipates additional power.

To ameliorate this condition, an additional cache state known as Mu is provided. In systems implementing an Mu state, certain (or sometimes all) read operations that are snooped by a snooping cache holding the target cache line in the M state cause the snooping cache to transition from the M state to the I state, thus relinquishing HPC authority, and provide the requesting cache a copy of the target cache line in the Mu state, thus transferring HPC authority for the target cache line to the requesting cache. This transfer of HPC status allows the requesting cache to subsequently modify the cache line without again communicating with the original cache (presuming no subsequent operation has changed the Mu cache to a new state). The transfer of HPC status in this manner is particularly useful if the read operation snooped by the original cache indicates that the read is likely to be soon followed by a store, for example, a store-conditional. Like the M state, the Mu state is modified relative to the LPC and is the only cached copy of the cache line in the system (i.e., it is unique). Unlike the M state, the Mu state is sticky. Consequently, a cache holding a target cache line in the Mu state does not relinquish HPC authority to a requesting cache that issues a read operation for the target cache line. If such a read operation is snooped by a cache holding the target cache line of the read operation in the Mu state, the snooping cache transitions the target cache line from the Mu state to a T state and provides the requesting cache a copy of the target cache line in the S state. In this manner, HPC write authority for the target cache line remains with the snooping cache holding the target cache line in the Mu state since the snooping cache is likely to update the target cache line in the near future in response to execution of a store instruction by the associated processor core.

The final "modified" state is the Me state, which is often known as the "exclusive" state. This coherence state refers to a cache line that is the only (i.e., unique) cached copy in the system and is unmodified relative to the LPC. A cache typically transitions a cache line into the Me state as the result of a read operation that is satisfied from the LPC in presence of no other cached copies of the line. The Me state is typically sticky, and therefore a snooped read of a target cache line in the Me state causes the snooping cache to transition the target cache line from the Me state to the Te state and provide a copy of the target cache line in the S state to the requesting cache. Though not reflected in Table II, in an alternate embodiment, the snooping cache may instead transition the target cache line of a snooped read operation from the Me state to the I state and provide the requesting cache with a copy of the target cache line in the Mu state (or an Meu state, not shown, which would indicate sticky and unmodified relative to the LPC).

A cache holding the target cache line of a snooped read operation in either the T state or Te state will provide a copy of the target cache line in the S state to the requesting cache. All store operations snooped at a cache holding the target cache line in an HPC state cause that snooping cache to relinquish the cache line to the requesting cache and transition the target cache line from the HPC state to the I state. Finally, a local read request of the processor core associated with a cache, whether a regular read request or a LARX request, does not alter an M, Mu, or Me state.

Multiprocessor data processing systems such as data processing system 100 of FIG. 1 implement a memory consistency model that specifies the legal possible executions of a given multiprocessor program with respect to memory accesses (e.g., among other things, the values that may be returned by load instructions, the order of writes to memory, those instruction execution dependencies that affect the ordering of memory accesses, and the final values for memory locations at the conclusion of a multiprocessor program). A memory consistency model is specified by two major characteristics: ordering of memory access requests and atomicity of store requests.

The ordering of memory requests specifies how memory requests may, if at all, be re-ordered relative to the order of their respective load and store instructions in the individual threads of execution in the multiprocessor program. Memory consistency models must define ordering of memory access requests in four general cases: (1) ordering of the memory requests for a load instruction to a following load instruction, (2) ordering of the memory requests for a load instruction to a following store instruction, (3) ordering of the memory requests for a store instruction to a following store instruction, and (4) ordering of the memory requests for a store instruction to a following load instruction. Strong consistency memory models will, in general, preserve all or at least most of these orderings. In particular, many strong consistency memory models enforce the first three orderings, but do not enforce store-to-load ordering. Weak consistency memory models will generally not enforce most or all of these orderings.

Atomicity of store requests refers to whether or not a given thread of execution can read the value of its own store request before other threads, and furthermore, whether the value written to the distributed shared memory system by the store request becomes visible to other threads in a logically instantaneous fashion or whether the value can become visible to other threads at different points in time. A memory consistency model is called "multi-copy atomic" if the value written by a store request of one thread becomes visible to all other threads in a logically instantaneous fashion. In general, strong consistency memory models are multi-copy atomic, and weak consistency memory models do not enforce multi-copy atomicity.

In a given multiprocessor program, program semantics often require that multi-copy atomicity and/or the various orderings between memory access requests are respected. Therefore, in an exemplary embodiment of data processing system 100, in which the distributed shared memory system implements a weak consistency memory model, so called "barrier" (e.g., synchronization) instructions are typically provided to allow the programmer to specify what memory access request orderings and atomicity are to be applied during execution of the multiprocessor program. In particular, a barrier instruction causes the distributed shared memory system to perform any memory accesses initiated by instructions preceding the barrier instruction prior to any memory accesses initiated by instructions following the barrier instruction.

Figure 2:
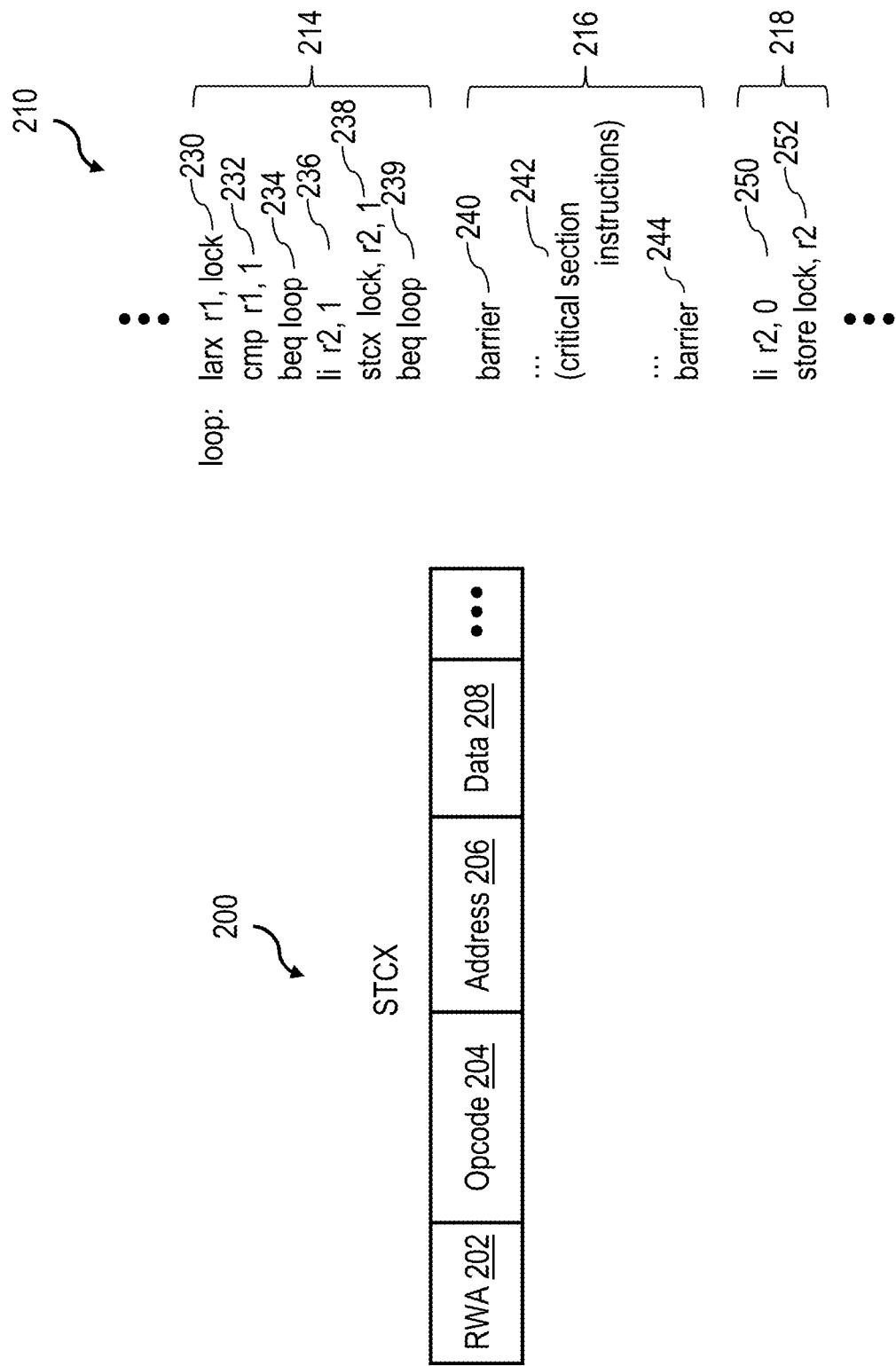
FIG. 2A depicts an exemplary store-conditional instruction that conditionally updates a location in shared memory based on a reservation flag.
FIG. 2B illustrates an exemplary instruction sequence that employs load-reserve and store-conditional instructions to coordinate execution of a critical section of a multithreaded program.

Referring now to FIG. 2A, there is depicted an exemplary store-conditional (STCX) instruction 200 in accordance with one embodiment. As known to those skilled in the art, a STCX instruction 200 is utilized to conditionally update the value of a variable in shared memory based on whether a reservation (e.g., in L2 RSV logic 146) for the variable previously established by a corresponding load-reserve (LARX) instruction remains valid.

In the depicted embodiment, STCX instruction 200 includes an opcode field 204 that specifies the architecture-dependent opcode for a store-conditional instruction, an address field 206 that directly or indirectly specifies one or more operands utilized to determine the real address of a target cache line to be conditionally updated, and a data field 208 that directly or indirectly specifies data to be stored to the target cache line. In addition, STCX instruction 200 includes a retain write authority (RWA) field 202 indicating whether or not write authority of the target cache line should be retained following the storage update, if made. An example of use of the RWA field 202 of a STCX instruction 200 is given in FIG. 2B below.

With reference now to FIG. 2B, there is illustrated an exemplary instruction sequence 210 that employs load-reserve and store-conditional instructions to coordinate execution of a critical section of a multithreaded program. As indicated, instruction sequence 210 includes, in program order, a lock acquisition sequence 214, critical section 216, and lock release sequence 218.

As is known in the art, critical section 216 is, by definition, a portion of a program that includes accesses to a shared resource (e.g., a shared in-memory data set) that must not be concurrently accessed by more than one hardware thread of the multiprocessor program. In order to keep the various hardware threads from making concurrent accesses to the shared resource, the multithreaded program bounds critical section instructions 242 with barrier instructions 240, 244 that order execution of critical section instructions 242 with respect to instructions in the same hardware thread that are outside critical section 216. In addition, the multiprocessor program ensures that not more than one hardware thread at a time enters into a critical section by implementing a lock to which access is synchronized by load-reserve and store-conditional instructions.

In particular, a hardware thread attempts to acquire the lock needed to enter critical section 216 through execution of lock acquisition sequence 214. Lock acquisition sequence 214 begins with a LARX instruction 230 that loads the value of the lock variable (i.e., lock) from shared memory into a private register r1 (e.g., one of registers 123) in the executing processor core 120. The value of the lock variable is then tested by compare instruction 232 to determine whether or not the lock is currently in a locked state (i.e., the lock is held by another hardware thread). If so, conditional branch instruction 234 causes execution to return to the beginning of polling instruction sequence 212 (which is described in greater detail below). If a determination that the lock is not currently held by another hardware thread, a LOAD immediate instruction 236 places a value of "1" representing a locked state into a register r2. A STCX instruction 238 then conditionally updates the lock variable in shared memory to the locked state, thus securing the lock for the executing thread. The success or failure of the STCX instruction in updating the value of the lock variable in shared memory is reflected in a condition code register in the processor core. Conditional branch instruction 239 tests the condition code found in the condition code register and conditionally redirects execution based on the success or failure of STCX instruction 238. If the relevant bit(s) of the condition code register is/are equal to zero, indicating that the conditional update to the lock variable indicated by STCX instruction 238 failed (e.g., due to an intervening storage-modifying access to the lock variable by another thread between execution of LARX instruction 230 and STCX instruction 238), lock acquisition sequence 214 will be repeated from LARX instruction 230. If, however, the conditional update to the lock variable indicated by STCX instruction 238 succeeds, the condition code will be non-zero, and processing will proceed sequentially to critical section 216. Once critical section 216 completes, the hardware thread will release the lock by updating the lock variable in shared memory by executing a lock release sequence 218 including a LOAD immediate instruction 250 that loads register r2 with a value of "0" representing an unlocked state and a STORE instruction 252 that updates the lock variable in shared memory with this value. Thereafter, execution of the thread proceeds to subsequent instructions, if any.

As a hardware thread of a processor core 120 executes instruction sequence 210 to enter critical section 216, one or more other hardware threads executing on the same processor core 120 (i.e., local or co-located hardware threads) or on other processor cores 120 (i.e., remote threads) may also be concurrently attempting to acquire and update the lock variable utilizing a similar or identical lock acquisition sequence 214. To ensure the orderly progression of critical section execution, it is helpful to carefully manage the coherence state of the cache line containing the lock variable. In particular, it is desirable for a first hardware thread executing a STORE instruction 252 to release the lock after exiting the critical section to update the cache line containing the lock variable to a non-sticky M state when releasing the lock. The load-reserve LARX instruction 230 of a second hardware thread subsequently attempting to enter the critical section will obtain the cache line containing the lock variable in a sticky Mu state by causing a read request to be transmitted to the cache holding the cache line in the M state. It is desirable at this point that the contention from other hardware threads not succeed in transferring write authority for the cache line containing the lock variable away from the L2 cache 130 associated with the processor core 120 executing the second hardware thread, as a loss of such write authority would slow the execution of the STORE instruction 252 releasing the lock variable and thus delay the ultimate availability, to other hardware threads, of the shared resource protected by critical section 216. Consequently, RWA field 202 of STCX instruction 238 is preferably set (e.g., to '1') to indicate that write authority for the cache line containing the lock variable is to be retained by the local L2 cache 230 supporting the executing hardware thread in the presence of snooped read requests. As a result, following success of STCX instruction 238, the local L2 cache 230 will update the coherence state associated with the target cache line to the Mu state rather than the M state. This Mu state enables the local L2 cache 230 to remain the HPC for the cache line containing the lock variable in the presence of snooped read requests of other processor cores 120 (e.g., read requests generated by the execution of LARX instructions 230 in failing lock acquisition sequences of the other processor cores 120).

Figure 3:
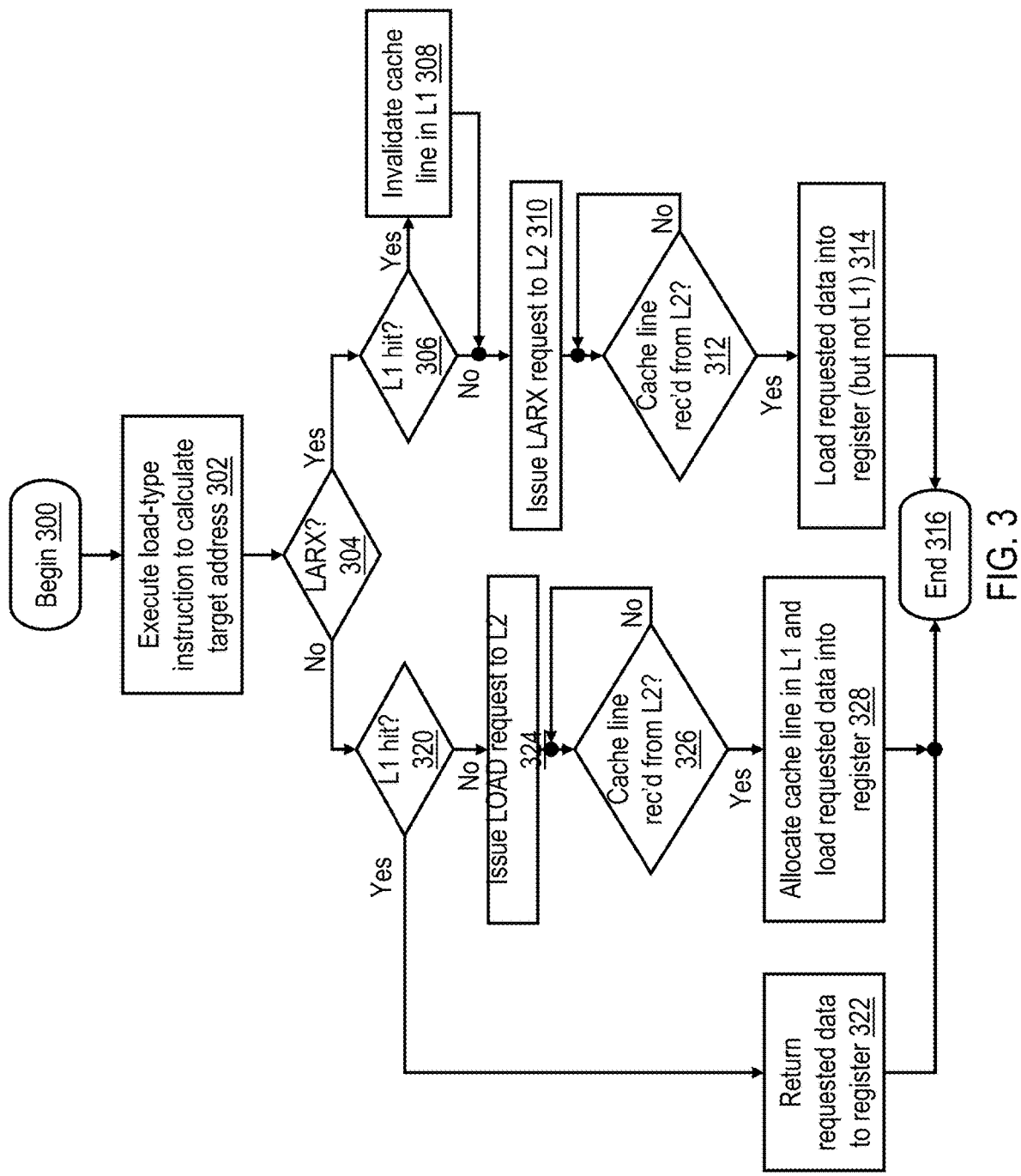
FIG. 3 is a high level logical flowchart of an exemplary method of processing a load-type instruction in a processor core in accordance with one embodiment.

With reference now to FIG. 3, there is depicted a high level logical flowchart of an exemplary method by which a processor core 120 of data processing system 100 processes a load-type instruction (e.g., a LOAD or LARX instruction) in accordance with one embodiment. As shown, the process begins at block 300 and thereafter proceeds to block 302, which illustrates execution units 124 receiving a load-type instruction, such as a LOAD or LARX instruction, from ISU 122 and then executing the load-type instruction to calculate the load target address. In a preferred embodiment, execution units 124 execute LARX instructions within a hardware thread in-order and without pipelining, meaning that the data words(s) requested by a LARX instruction must be loaded to one or more registers 123 in processor core 120 before the next LARX or STCX instruction begins execution. These restrictions simplify the management of reservations by reservation logic 146 in L2 cache 130.

Following execution of the load-type instruction, an indication of the instruction type and the load target address are received from execution units 124 by LD unit 128. As illustrated at block 304, if the indication of the instruction type indicates the load-type instruction executed at block 302 was not a LARX instruction, LD unit 128 performs the processing illustrated at block 320 and following blocks, which are described below. If, however, the load-type instruction executed at block 302 was a LARX instruction, LD unit 128 performs the processing depicted at block 306 and following blocks.

At block 306, LD unit 128 determines whether or not the load target address of the LARX request resides in L1 cache 126. If so, LD unit 128 invalidates the cache line containing the load target address in L1 cache 126 (block 308). Those skilled in the art should appreciate that the invalidation of the cache line containing the load target address in L1 cache 126 is a simplifying design choice and that in other embodiments the cache line containing the load target address need not be invalidated in L1 cache 126. Following block 308 or in response to determining that the load target address of the LARX instruction missed in L1 cache 126, LD unit 128 issues a LARX request to L2 cache 130 via load bus 160 (block 310). The LARX request includes, for example, an indication of the request type, the load target address, and an identifier of the issuing thread. After buffering the LARX request in L2 LDQ 161, L2 cache 130 dispatches the LARX request to an RC machine 142 for servicing, as described further below with reference to FIG. 4.

Next, at block 312, LD unit 128 awaits return of the requested cache line identified by the load target address from L2 cache 130. In response to receipt of the requested cache line, LD unit 128 transfers the data word(s) associated with the load target address into a core register 123, but does not cache the requested cache line in L1 cache 126 (block 314). It should be appreciated that in alternative embodiments that do not invalidate the requested cache line at block 308, the requested cache line can instead be cached in L1 cache 126 to permit subsequent loads (including subsequent load-reserve requests), to hit in L1 cache 126. Following block 314, the process of FIG. 3 terminates at block 316.

Referring now to block 320, in response to LD unit 128 determining that the load-type request is not a LARX request, but is instead a LOAD request (e.g., a fronting LOAD), LD unit 128 also determines whether or not the load target address hits in L1 cache 126. If so, LD unit 128 simply places a copy of the requested data word(s) in the appropriate core register 123 (block 322). If, however, the load target address misses in L1 cache 126, LD unit 128 issues a LOAD request to the associated L2 cache 130 via load bus 160 (block 324). The LOAD request may include, for example, an indication of the request type, the load target address, and an identifier of the issuing thread. After buffering the LOAD request in L2 LDQ 161, L2 cache 130 dispatches the LOAD request to an RC machine 142 for servicing, as described further below with reference to FIG. 4.

Next, at block 326, LD unit 128 waits until the requested cache line containing the load target address is returned by L2 cache 130. In response to receipt of the requested cache line, LD unit 128 transfers the data word(s) associated with the load target address into a core register 123 and allocates the requested cache line in L1 cache 126 (block 328). Following block 322 or block 328, the process of FIG. 3 terminates at block 316.

Figure 4:
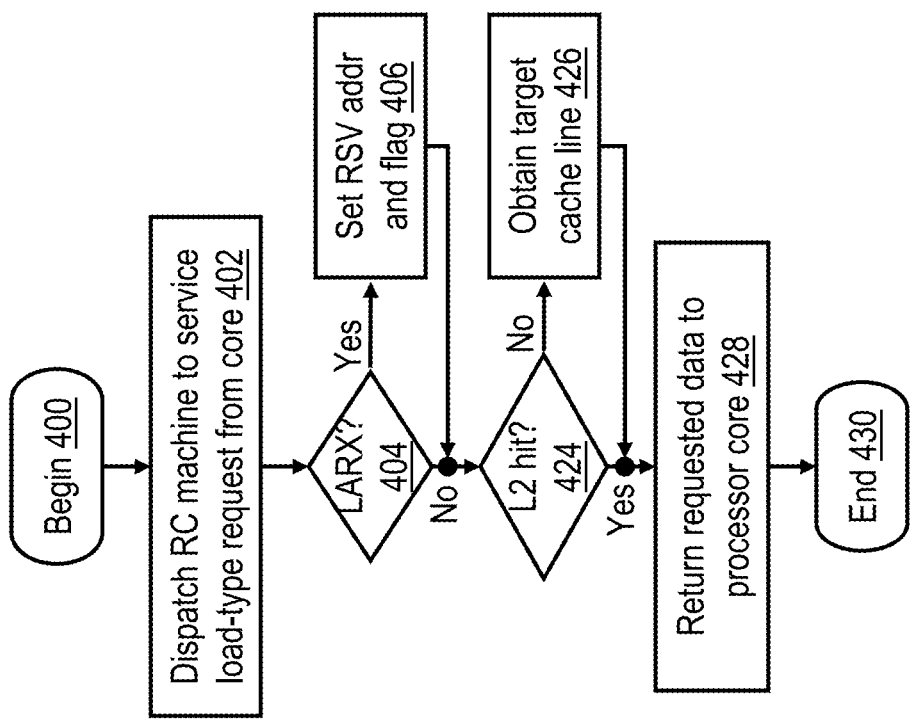
FIG. 4 is a high level logical flowchart of an exemplary method of processing a load-type request in a lower level cache in accordance with one embodiment.

Referring now to FIG. 4, there is depicted a high level logical flowchart of an exemplary method by which an L2 cache 130 of data processing system 100 processes a load-type request in accordance with one embodiment. The process begins at block 400 and then proceeds to block 402, which depicts L2 cache 126 dispatching an RC machine 142 to service a next load-type request of the associated processor core 120 that is enqueued in L2 LDQ 161. Next, at block 404, the dispatched RC machine 142 determines whether or not the load-type request is a LARX request or a LOAD request. If the load-type request is a LOAD request, the process passes to block 424 and following blocks, which are described below. If, however, RC machine 142 determines at block 404 that the load-type request is a LARX request, the process proceeds to block 406.

As illustrated at block 406, RC machine 142 establishes a reservation for the load target address in L2 cache 130 in the reservation register of the appropriate hardware thread by placing the load target address in the appropriate reservation address field 148 and setting the associated reservation flag 150. Following block 406, the process proceeds to block 424.

At block 424, the dispatched RC machine 142 determines whether or not the load target address of the LOAD or LARX request hits in L2 directory 141. If so, the process passes directly to block 428. If not, RC machine 142 issues a request on system interconnect 104 in order to obtain a copy of the requested cache line from another cache hierarchy or system memory 108 (block 426). Following block 426, the process proceeds to block 428, which depicts RC machine 142 returning the requested cache line to the associated processor core 120. The return of the requested cache line to the associated processor core 120 at block 430 ends all operations of RC machine 142 required to service the LOAD or LARX request. The process of FIG. 4 thereafter terminates at block 430.

Figure 5:
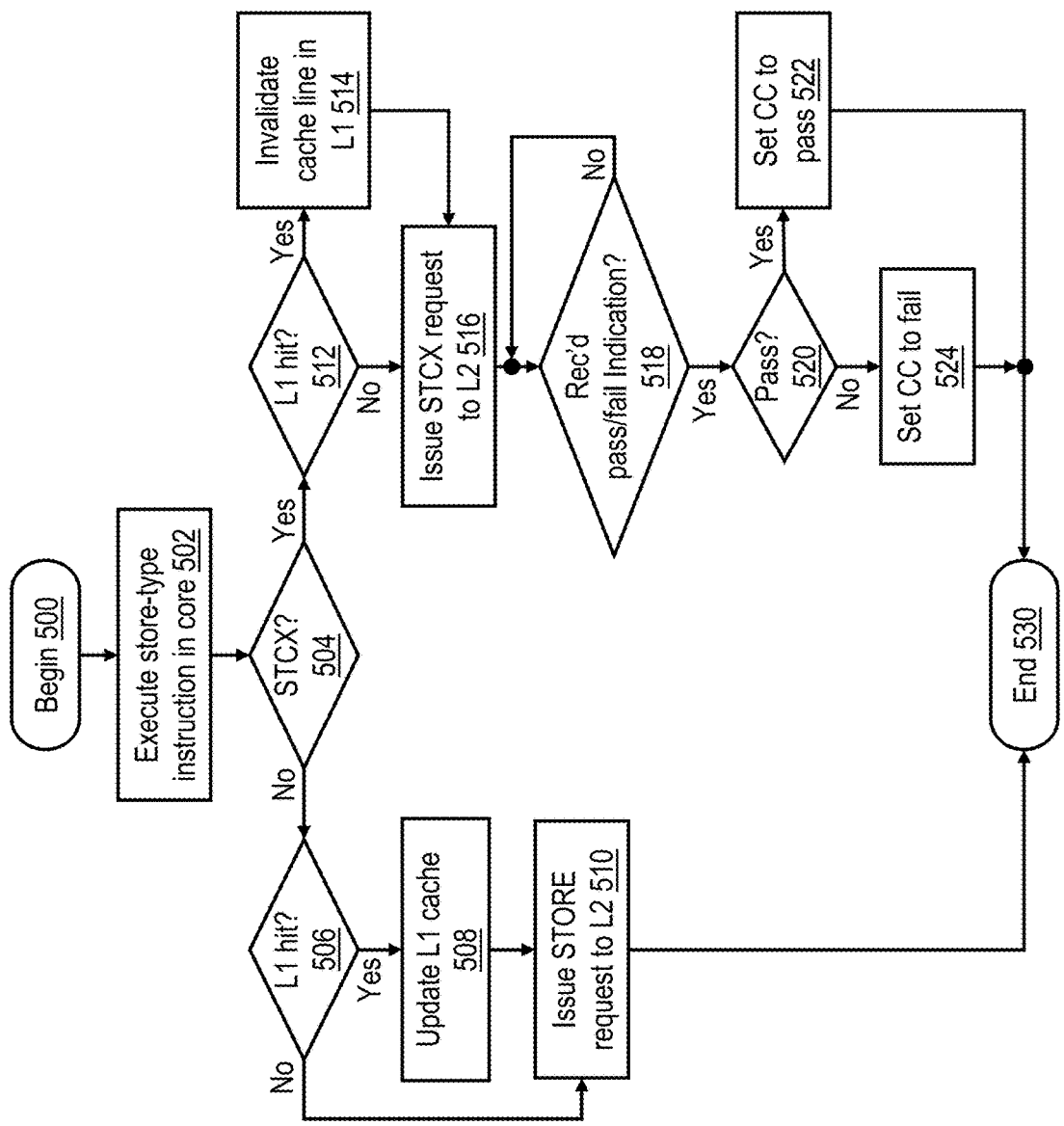
FIG. 5 is a high level logical flowchart of an exemplary method of processing a store-type instruction in a processor core in accordance with one embodiment.

With reference now to FIG. 5, there is illustrated a high level logical flowchart of an exemplary method of processing a store-type instruction in a processor core in accordance with one embodiment. As depicted, the process begins at block 500 and thereafter proceeds to block 502, which illustrates execution units 124 receiving a store-type instruction, such as a STORE or STCX instruction, from ISU 122 and then executing the store-type instruction to calculate the store target address. As with the LARX execution described above, execution units 124 also preferably execute STCX instructions appearing in the same hardware thread in-order and without pipelining with respect to both LARX and STCX instructions.

Upon execution of the store-type instruction, execution units 124 place a corresponding store-type request including the store target address calculated by execution of the store-type instruction, a thread identifier, and store data within L1 STQ 127. The STCX request generated by execution of a STCX instruction preferably additionally includes the RWA field 202 from the STCX instruction. In one preferred embodiment, L1 STQ 127 is implemented as a shared FIFO queue that buffers and orders store requests of all threads executing within processor unit 102. When the store-type request corresponding to the executed store-type instruction reaches the bottom or commit entry of L1 STQ 127, L1 STQ 127 determines at block 504 whether or not the store-type request is a STCX request. If so, the process passes to block 512 and following blocks, which are described below. If, however, the store-type request is not a STCX request, but is instead a STORE request, the process of FIG. 5 proceeds from block 504 to block 506.

At block 506, L1 STQ 127 additionally determines if the store target address of the STORE request hits in L1 cache 126. If so, L1 STQ 127 updates the target cache line held in L1 cache 126 with the store data referenced by the STORE request (block 508). Following block 508 or in response to the store target address missing in L1 cache 126 at block 506, L1 STQ 127 removes the STORE request from L1 STQ 127 and issues the STORE request to L2 STQ 166 of L2 cache 130 via store bus 164 (block 510). Following block 510, the process of FIG. 5 ends at block 530.

Referring now to block 512, L1 STQ unit 127 determines whether or not the store target address of the STCX request hits in L1 cache 126. If so, L1 STQ 127 invalidates the target cache line held in L1 cache 126 (block 514). Following block 514 or in response to the store target address missing in L1 cache 126 at block 512, L1 STQ 127 issues the STCX request to L2 STQ 166 of L2 cache 130 via store bus 164 (block 516). L1 STQ 127 then awaits return via pass/fail bus 174 of a pass/fail indication for the STCX request indicating whether or not the STCX request succeeded in updating L2 cache 130 (block 518). In response to receipt of the pass/fail indication via pass/fail bus 174, processor core 120 provides the pass/fail indication to execution units 124 (e.g., to indicate whether the path of execution should change) and, as shown at blocks 520-524, updates a condition code register 123 to indicate whether the STCX request passed or failed. Thereafter, the STCX request is deallocated from L1 STQ 127, and the process of FIG. 5 terminates at block 530.

Figure 6A:
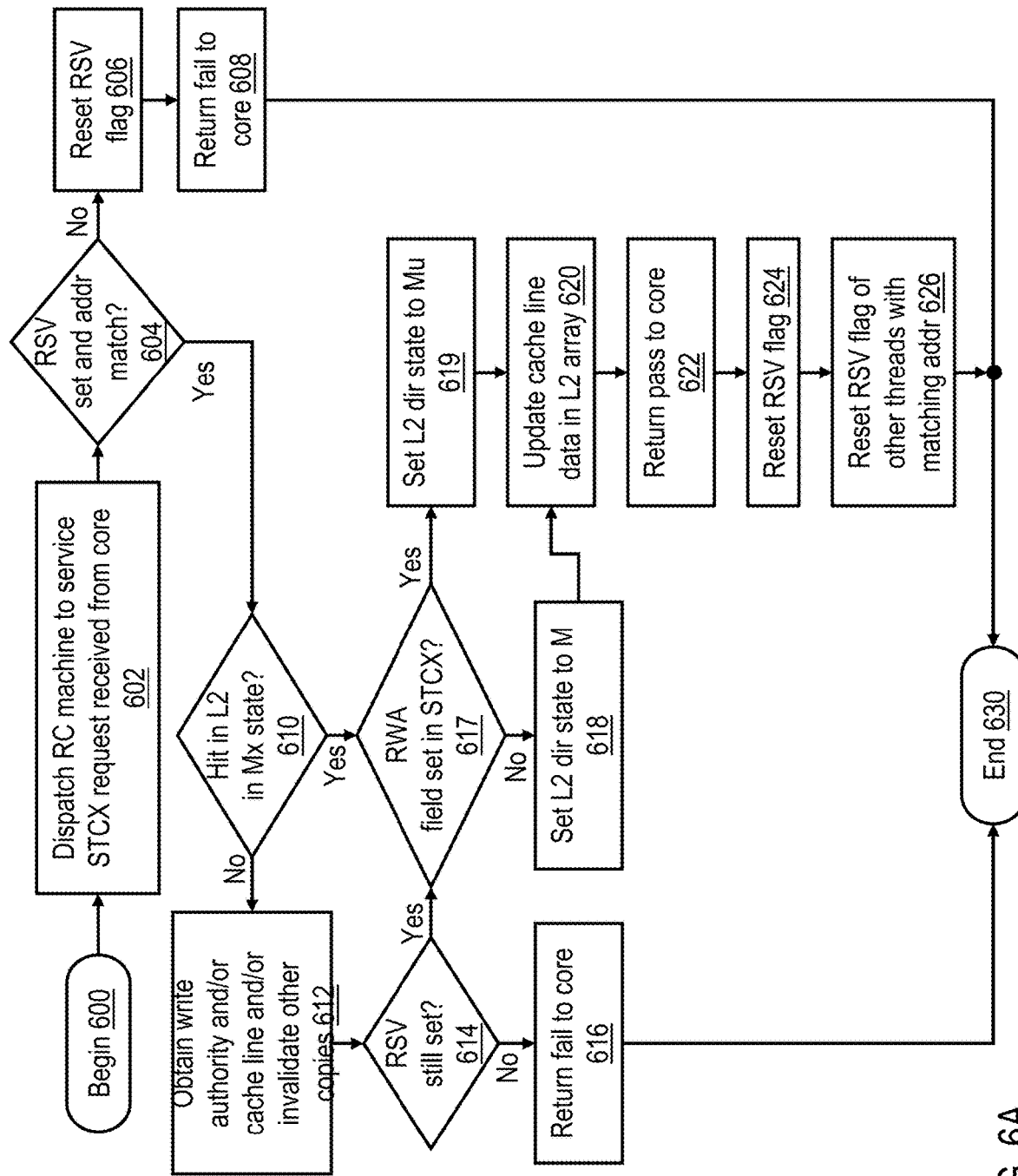
FIG. 6A is a high level logical flowchart of an exemplary method of processing a store-conditional request in lower level cache in accordance with one embodiment.

Referring now to FIG. 6A, there is depicted a high level logical flowchart of an exemplary method of processing a STCX request in a lower level cache in accordance with one embodiment. As described above, STCX requests are received by L2 cache 130 within L2 STQ 166 via store bus 164. In some embodiments, L2 STQ 166 may be implemented, like L1 STQ 127, as a FIFO queue. In such embodiments, the process begins at block 600 in response to receipt of a store-type request in the bottom entry of L2 STQ 166. The store request at the bottom entry of L2 STQ 166 will then be selected for dispatch to an idle RC machine 142 for processing, as shown at block 602.

In response to receipt of a STCX request for servicing, the dispatched RC machine 342 transitions to the busy state and determines at block 604 whether the issuing hardware thread has a valid reservation for the store target address by determining whether the thread's RSV flag 150 is set and the associated RSV register 148 specifies a reservation address matching the store target address (block 604). If not, RC machine 342 resets the RSV flag 150 of the issuing thread (block 606) and returns a fail indication to the processor core 120 via pass/fail bus 174 to report that the STCX request made no update to L2 cache 130 (block 608). Thereafter, the RC machine 142 allocated to service the STCX request returns to the idle state, and the process of FIG. 6 ends at block 630.

Returning to block 604, in response to RC machine 142 determining that the issuing hardware thread has a valid reservation for the store target address of the STCX request, RC machine 142 determines whether or not the store target address of the STCX request hits in L2 directory 141 in an Mx (e.g., Me, M, or Mu) coherence state that confers authority on L2 cache 130 to modify the target cache line without the need to communicate with any other L2 caches 130 (block 610). If so, the STCX will succeed in the conditional update of shared memory, and the process passes to block 617, which is described below. If not, RC machine 142 obtains, if necessary, a copy of the target cache line from another cache hierarchy or memory controller 106, obtains, if necessary, authority to modify the target cache line, and/or invalidates other copies of the target cache line, if any, by issuing one or more requests on system interconnect 104 (block 612). At block 614, the RC machine 142 again checks whether or not the issuing hardware thread has a valid reservation for the store target address of the STCX request, as the reservation may have been reset due to an intervening store access of another hardware thread while a copy of the target cache line in a writeable coherence state was being obtained at block 612. In response to a determination that the reservation is still set, the process passes to block 617, which is described below. However, in response to a determination at block 614 that the reservation is not still set (i.e., has been reset by the access of another hardware thread), RC machine 142 returns a fail indication to processor core 120 via pass/fail bus 174 to report that the STCX request failed to update L2 cache 130 (block 616). The process thereafter ends at block 630.

Block 617 illustrates the RC machine 142 determining whether or not the RWA field was set (e.g., to '1') in the STCX request. If not, RC machine 142 updates the coherence state for the target cache line in L2 directory 141 to the M state (block 618). However, if RC machine 142 determines at block 617 that the RWA field was set (e.g. to '1') in the STCX request, RC machine 142 updates the coherence state for the target cache line in L2 directory 141 to the Mu state, meaning that L2 cache 130 will subsequently retain write authority for the target cache line in the presence of snooped read requests (block 619). Following either block 618 or block 619, the process proceeds to block 620, which illustrates RC machine 142 updating the target cache line in L2 array 140 with the store data of the STCX request. RC machine 142 additionally returns a pass indication to processor core 120 via pass/fail bus 174 to report successful update of the L2 cache 130 (block 622). RC machine 142 also resets the issuing hardware thread's RSV flag 150 (block 624), as well as the RSV flag 150 of any other thread specifying a matching store target address in its associated RSV address register 148 (block 626). It should be noted that in this exemplary embodiment a STCX request only cancels the reservations of other threads at block 626 after it is verified that the STCX is going to succeed in its conditional update of shared memory. Thereafter, RC machine 142 returns to the idle state, and the process of FIG. 6A ends at block 630.

With reference now to FIG. 6B, there is depicted a high level logical flowchart of an exemplary method of processing a STORE request in a lower level cache in accordance with one embodiment. The process of FIG. 6B begins at block 650 as a STORE request is received by L2 cache 130 within L2 STQ 166. The STORE request is thereafter selected for dispatch to an idle RC machine 142 for processing, as shown at block 652.

In response to receipt of a STCX request for servicing, the dispatched RC machine 142 transitions to the busy state and resets the RSV flag 150 of any hardware thread other than the initiating hardware thread that specifies a matching store target address in its associated RSV address register 148 (block 656). RC machine 142 additionally determines whether or not the store target address of the STORE request hits in L2 directory 141 in a writeable coherence state that confers authority on L2 cache 130 to modify the target cache line (block 660). If so, the process passes to block 664, which is described below. If not, RC machine 142 obtains authority to modify the target cache line and, if necessary, a copy of the target cache line from another cache hierarchy or memory controller 106 by issuing one or more requests on system interconnect 104 (block 662). At block 664, RC machine 142 updates the target cache line in L2 array 140 with the store data of the STORE request. In addition, RC machine 142 updates the coherence state of the target cache line recorded in L2 directory 141 in accordance with the currently implemented coherence state update policy for stores, as discussed below with reference to FIG. 6C. Thereafter, RC machine 142 returns to an idle state, and the process of FIG. 6B ends at block 670.

FIG. 6C is a high level flowchart showing the coherence state update made at block 668 of FIG. 6B in accordance with the prior art. In particular, after the process begins at block 680, the RC machine 142 updates the coherence state of the target cache line of the store request recorded in L2 directory 141 to the M state. Thereafter, the process of FIG. 6C ends at block 684.

Figure 7:
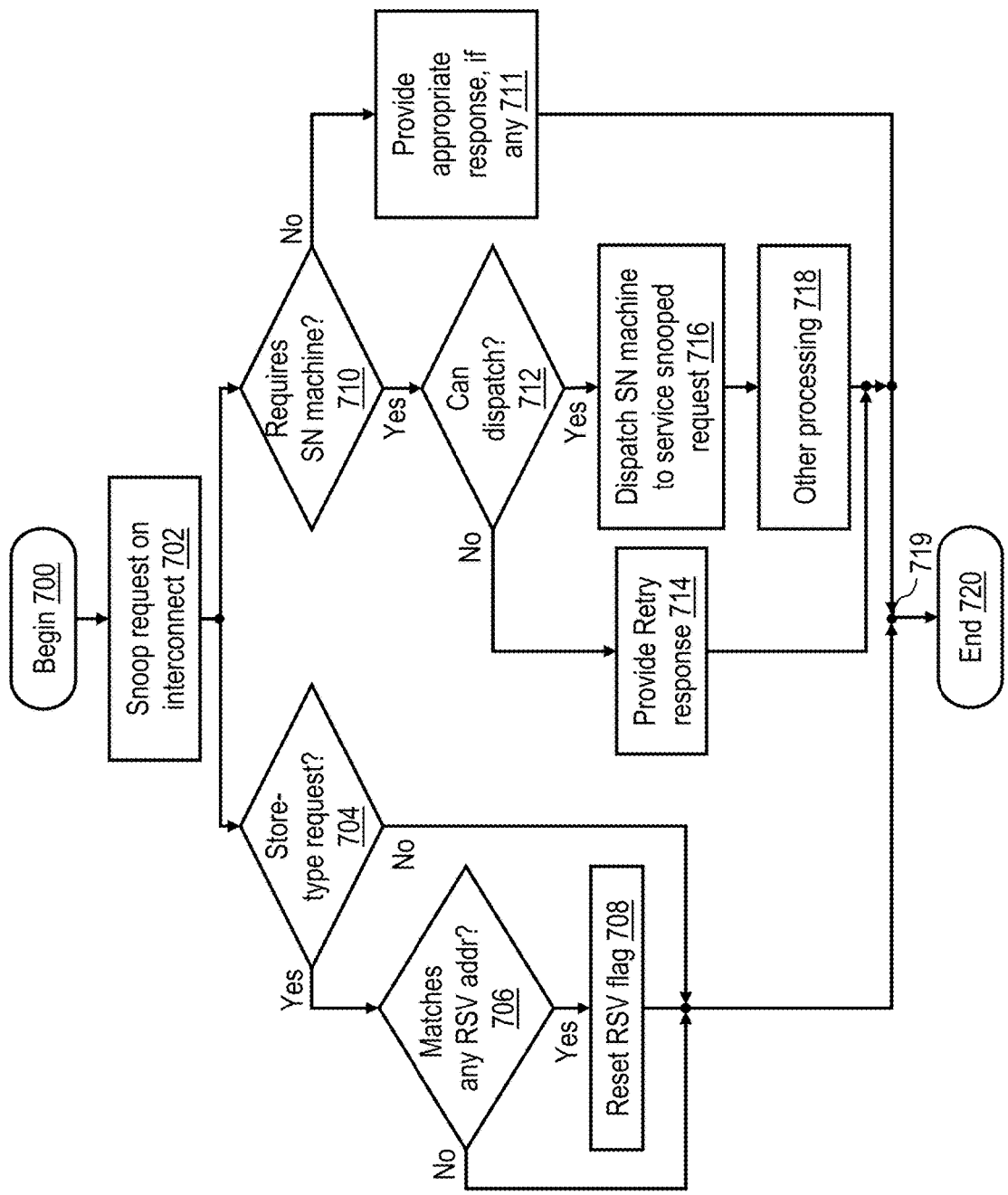
FIG. 7 is a high level logical flowchart of an exemplary method of processing a snooped request in accordance with one embodiment.

With reference now to FIG. 7, there is illustrated a high level logical flowchart of an exemplary method by which the L2 cache 130 of a processing unit 102 services a request snooped from a system interconnect in accordance with one embodiment. Those skilled in the art will appreciated that multiple instances of this process can be active in a given L2 cache 230 concurrently. As depicted, the process begins at block 700 and thereafter proceeds to block 702, which illustrates an L2 cache 130 snooping a request (e.g., issued by anther processing unit 102) on system interconnect 104 via snoop bus 170. Following block 702, the process of FIG. 7 bifurcates into two concurrent parallel subprocesses—a reservation update subprocess depicted at blocks 704-708 in which the affect, if any, of the snooped request on pending reservations tracked in the L2 cache 130 is managed, and a request servicing subprocess at blocks 710-718 in which the snooped request is serviced by the snooping L2 cache 130, if necessary. Following completion of both subprocesses, the two subprocesses merge at join point 719, and process of FIG. 7 ends at block 720.

Referring first to the reservation update subprocess, the snooping L2 cache 130 determines at block 704 whether or not the snooped request is a store-type request that modifies or requests authority to modify shared memory. If not, no update to any local reservation is required, and the reservation update subprocess proceeds to join point 719. If, however, the snooped request is a store-type request that indicates the intention to modify a target cache line, L2 cache 130 resets the RSV flag 150 associated with any of its RSV address registers 148 that stores the address of the target cache line (blocks 706-708). Following either block 706 or block 708, the reservation update subprocess proceeds to join point 719.

Referring now to the request servicing subprocess, L2 cache 130 determines at block 710 whether or not servicing the snooped request requires allocation of a SN machine 144. If not, no SN machine 144 is dispatched to service the snooped request. The L2 cache 130 will nevertheless provide the appropriate coherence response, if any (block 711). The request servicing subprocess then proceeds to join point 719. If, however, L2 cache 130 determines at block 710 that a SN machine 144 is required to service the snooped request, L2 cache 130 further determines at block 712 whether or not a SN machine 144 can presently be dispatched. In order to dispatch a SN machine 144, a SN machine 144 must be available (i.e., in the idle state) and no RC machine 146 or SN machine 144 can be busy servicing a request having a target cache line address matching that specified by the snooped request (among other dispatch constraints). Thus, for example, an RC machine 146 allocated to service a fronting LOAD request (as discussed above with reference to FIG. 4) will prevent the dispatch of a local SN machine 144 to service a snooped request specifying a conflicting (i.e., matching) target cache line address.

In response to a determination at block 712 that a SN machine 144 cannot presently be dispatched to service the snooped request, L2 cache 130 provides a Retry coherence response on system interconnect 104 to indicate its present inability to service the snooped request (block 714). (In response to this Retry coherence response, the source of the snooped request may later represent the request on system interconnect 104.) Following block 714, the request servicing subprocess proceeds to join point 719. If, however, L2 cache 130 determines at block 712 that a SN machine 144 can presently be dispatched to service the snooped request, L2 cache 130 dispatches an idle SN machine 144 to service the snooped request (block 716). The dispatched snoop machine 144 transitions from the idle state to the busy state and then performs at block 718 whatever additional processing is required to service the snooped request (e.g., updating L2 array 140 and L2 directory 141 and/or L1 cache 126, sourcing a copy of the target cache line, providing protocol-dependent coherence responses, etc.). Following completion of its processing at block 718, the SN machine 144 dispatched to service the snooped request transitions from the busy state to the idle state, and the request servicing subprocess proceeds to join point 719.

In the foregoing discussion, a successful STCX request causes the coherence state of the target cache line to be updated based on the explicit guidance given by the RWA field 202 of the initiating STCX instruction. Thus, following the successful STCX request in lock acquisition sequence 214 preceding a critical section 216, the coherence state of the target cache line will be updated to the Mu state to promote retention of write authority for the target cache line if RWA field 202 is set to 1, as discussed above with reference to blocks 617 and 619 of FIG. 6A. For other uses of LARX/STCX sequences, such as isolated atomic updates of memory locations, the coherence state will instead be updated to the M state due to RWA field 202 being reset to 0, as discussed above with reference to blocks 617-618 of FIG. 6A. Conventional store requests, on the other hand, invariably cause the coherence state of the target cache line to be updated to the M state, as noted at block 682 of FIG. 6C. As a consequence of the coherence update policy utilized for conventional store requests, any store instruction among critical section instructions 242 that targets a storage location in the same cache line as the lock variable will cause the Mu state established for that cache line by STCX instruction 238 to be updated to the M state rather than the Mu state. As a result of this false sharing of the target cache line containing the lock variable, the L2 cache 130 for the processor core 120 holding the lock will invalidate its copy of the target cache line in response to snooping any read request of another processor core 120 attempting to acquire the lock. Consequently, the release of the lock initiated by execution of STORE instruction 252 will be performed slowly, as the processor core 120 has to re-acquire write authority for the target cache line by issuing one or more requests on system interconnect 104. It should further be appreciated that, while it is undesirable for an store instruction in critical section instruction 242 to update the cache line containing the lock variable to the M state, it is necessary for STORE instruction 252 to do so in order to promote rapid acquisition of the lock by another processor core 120 once the lock is released.

The present disclosure addresses the foregoing issues with existing coherence state update policies and improves data processing system performance by selectively updating a coherence state in response to an unconditional store request. In a first embodiment described with reference to FIGS. 8A-8B, a store instruction contains a field that selectively causes a resulting unconditional store request to refrain from updating the coherence state of the target cache line of the unconditional storage request under certain conditions. In a second embodiment, which is described below with reference to FIGS. 9A-9C, the selective coherence state update behavior of an unconditional store request is governed by a register setting. In a third embodiment described with reference to FIGS. 10A-10C, the update of the coherence state of the target cache line of an unconditional store request is controlled by use of a special store opcode.

Figure 8A:
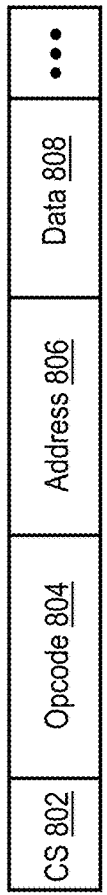
FIG. 8A depicts an exemplary store instruction that, in accordance with a first embodiment, includes a critical section field selectively indicating a coherence state update for a target cache line.

Referring now to FIG. 8A, there is depicted an exemplary store instruction that, in accordance with a first embodiment, includes a critical section field selectively indicating a coherence state update for a target cache line of a store request. In the depicted embodiment, STORE instruction 800 includes an opcode field 804 that specifies the architecture-dependent opcode for an unconditional store instruction, an address field 806 that directly or indirectly specifies one or more operands utilized to determine the real address of a target cache line to be unconditionally updated, and a data field 808 that directly or indirectly specifies data to be stored to the target cache line. In addition, STORE instruction 800 includes a field 802, referred to herein as a critical section (CS) field, that indicates whether or not an existing modified coherence state of the target cache line should be updated by the store request generated through execution of STORE instruction 800. For example, in one embodiment, CS field 802 may be set to '1' to indicate that the coherence state of the target cache line should not be updated if the prior coherence state is M or Mu and reset to '0' to indicate that the coherence state of the target cache line should be updated to M. Execution of STORE instruction 800 by execution units 124 generates a corresponding store request including at least the store target address determined from address field 806, the store data specified by data field 808, and the CS field 802 from STORE instruction 800.

Figure 8B:
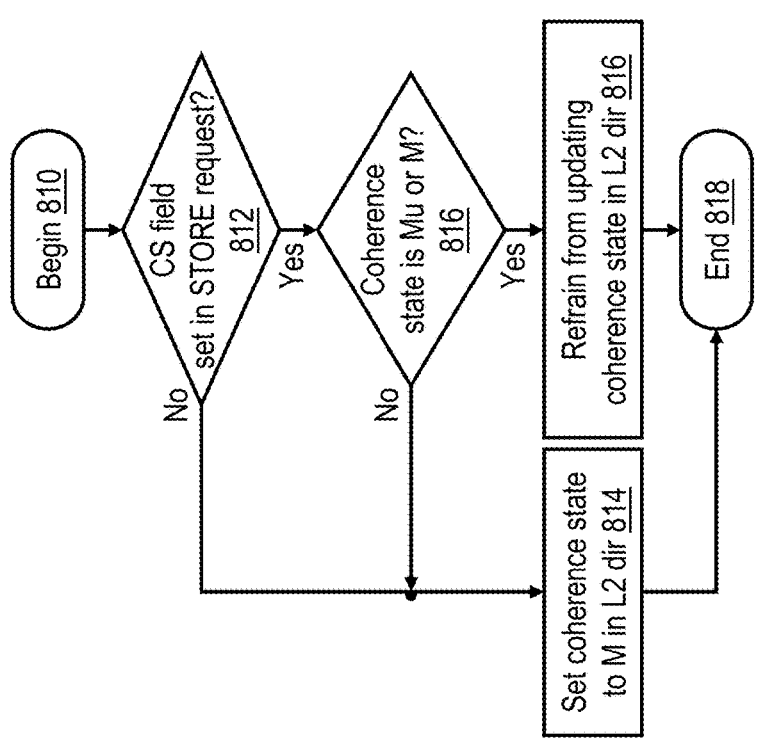
FIG. 8B is a high level logical flowchart of an exemplary method of selectively updating a coherence state of a target cache line of a store request in accordance with the first embodiment.

With reference now to FIG. 8B, there is illustrated a high level logical flowchart of an exemplary method of selectively updating a coherence state of a target cache line of a store request in accordance with the first embodiment. The depicted method can be performed, for example, at block 668 of FIG. 6B, where the coherence state of a target cache line of a store request is updated in accordance with the indicated coherence state update policy for stores. In this case, the coherence state update policy that is implemented is selected based on the setting of the CS field in the store request.

The process of FIG. 8B begins at block 810 and then proceeds to block 812, which illustrates the RC machine 142 servicing the store request determining whether or not the CS field in the store request is set (e.g., to '1'). If not (e.g., the CS field is reset to '0'), RC machine 142 sets the coherence state for the target cache line to M in the local L2 directory 141 (block 814). Thereafter, the process ends at block 818. However, in response to a determination at block 812 that the CS field is set, the RC machine 142 also determines at block 816 whether the existing coherence state of the target cache line is Mu or M in the local L2 directory 141. If not (e.g., the coherence state is Me, T, S or I), the process passes to block 814, which has been described. If, however, RC machine 142 determines at block 816 that the existing coherence state of the target cache line is Mu or M, RC machine 142 refrains from updating the coherence state of the target cache line in response to the storage update (block 816). Thereafter, the process ends at block 818.

As a result of this coherence state update policy, any store instructions in critical section 216 (which will have CS field 802 set) will leave undisturbed the Mu state established for the cache line containing the lock variable by STCX instruction 238. As a result, the processing unit 102 executing the critical section will retain write authority for the cache line containing the lock variable in the presence of read requests. However, STORE instruction 252, which will not have CS field 802 set, will update the coherence state of the cache line containing the lock variable to M, facilitating the transfer of write authority to another processing units 102 requesting the lock.

In a second embodiment, the coherence state update policy that is implemented for a given store request can be controlled based on the setting of a register rather than a field in the store request itself. For example, FIG. 1 illustrates an embodiment in which the coherence state update policy is governed by a CS field 121 of MSR 119, which can be set and/or reset by one or more special-purpose instructions. For example, with reference now to FIG. 9A, there are illustrated exemplary critical section begin and critical section end instructions that, in accordance with a second embodiment, can be utilized to demarcate the beginning and end, respectively, of a critical section of a multithreaded program. As depicted, critical section begin (CS_Begin) instruction 902 includes at least an opcode field 904 that specifies a distinct opcode denoting the beginning of a critical section of a multithreaded program. When executed by execution units 124, CS_Begin instruction 902 sets CS field 121 of MSR 119 (e.g., to '1') to indicate that the coherence state of the target cache line of a store request that is in the M or Mu state should be unchanged. Critical section end (CS_End) instruction 906 similarly includes at least an opcode field 908 that specifies a distinct opcode denoting the end of a critical section of a multithreaded program. When executed by execution units 124, CS_End instruction 906 resets CS field 121 of MSR 119 (e.g., to '0') to indicate that the coherence state of the target cache line of a store request that is in the M or Mu state should updated by the store request to M.

FIG. 9B depicts an exemplary multithreaded program 910 including a critical section 912 demarcated by CS_Begin and CS_End instructions in accordance with the second embodiment. In this example, critical section 912 begins with a barrier instruction 914 as discussed above with reference to FIG. 2B. Barrier instruction 914 is followed immediately by a CS_Begin instruction 916 that, when executed, causes execution units 124 to set CS field 121 in MSR 119. As a result, all store instructions within critical section instruction 918 will refrain from updating an existing M or Mu coherence state. Following critical section instructions 918 and immediately previous to an enclosing barrier 922, critical section 912 includes a CS_End instruction 920 that, when executed, causes execution units 124 to reset CS field 121 in MSR 119.

Those skilled in the art will appreciate that any interrupts may optionally reset CS field 121 (e.g., to '0') upon entry into the interrupt handler and may restore CS field 121 to its prior state upon exit of the interrupt handler. In this manner, the interrupt handler would be allowed to execute according to the conventional coherence state update policy independently of (and without disturbing) any coherence update policy established by CS field 121 for a critical section 912.

It should also be appreciated that, in some embodiments, CS_Begin instruction 902 or 916 can be omitted. In such embodiments, CS field 121 can be set (e.g., to '1') by the successful execution of a STCX instruction 200 having its RWA field 202 set and can be reset (e.g., to '0') by a CS_End instruction 920 as discussed above. Those skilled in the art will recognize that additional techniques, not illustrated here, will be required to support nesting of critical sections including counters to record the depth of the nesting to determine which of the CS_End instructions corresponds to the outermost critical section and must reset CS field 121.

Referring now to FIG. 9C, there is depicted a high level logical flowchart of an exemplary method of selectively updating a coherence state of a target cache line of a store request in accordance with the second embodiment. The depicted method can be performed, for example, at block 668 of FIG. 6B, where the coherence state of a target cache line of a store request is selectively updated in accordance with the desired coherence update policy for stores. In this case, the coherence state update policy that is implemented is selected based on the setting of the CS field 121 in MSR 119.

The process of FIG. 9C begins at block 930 and then proceeds to block 932, which illustrates the RC machine 142 servicing a store request determining whether or not the CS field 121 in MSR 119 is set (e.g., to '1'). For example, in some embodiments, processor core 120 may append this value to each store request as it is placed in (or alternatively, issued from) L1 STQ 127. In other embodiments, RC machine 142 may access MSR 119 directly. In response to RC machine 142 determining that CS field 121 is not set (e.g., CS field 121 is reset to '0'), RC machine 142 sets the coherence state for the target cache line to M in the local L2 directory 141 (block 934). Thereafter, the process ends at block 940. However, in response to a determination at block 932 that CS field 121 is set, the RC machine 142 also determines at block 936 whether the existing coherence state of the target cache line is Mu or M in the local L2 directory 141. If not (e.g., the coherence state is Me, T, S or I), the process passes to block 934, which has been described. If, however, RC machine 142 determines at block 936 that the existing coherence state of the target cache line is Mu or M, RC machine 142 refrains from updating the coherence state of the target cache line in response to the storage update (block 938). Thereafter, the process of FIG. 9C ends at block 940.

Again, as a result of this coherence state update policy, any store instructions in critical section 912 (for which CS field 121 will be set) will leave undisturbed the Mu state established for the cache line containing the lock variable by STCX instruction 238. As a result, the processing unit 102 executing the critical section will retain write authority for the cache line containing the lock variable in the presence of read requests. However, the STORE instruction utilized to release the lock controlling access to the critical section resource (for which CS field 121 will not be set) will update the coherence state of the cache line containing the lock variable to M, facilitating the transfer of write authority to another processing units 102 requesting the lock.

In a third embodiment, the default coherence state update policy for store requests is modified from the prior art policy depicted in FIG. 6C. Instead of always updating the coherence state of the target cache line of a store request to the M state, in the third embodiment the default coherence update policy for stores is to refrain from updating the coherence state of target cache lines in either of the M or Mu states. This new default coherence update policy can then be selectively changed by the execution of an explicit store instruction that instead updates a target cache line to the M state in which write authority for the target cache line will be transferred to the master of a snooped read request.

Referring now to FIG. 10A, there is illustrated an exemplary critical section store instruction that, in accordance with a third embodiment, can be utilized to specify a desired coherence state update policy for a target cache line. In the depicted embodiment, CS_Release_store instruction 1000 includes an opcode field 1002 that specifies an architecture-dependent opcode for an unconditional store instruction that is to update the coherence state of the target cache line to M, an address field 1004 that directly or indirectly specifies one or more operands utilized to determine the real address of the target cache line to be unconditionally updated, and a data field 1006 that directly or indirectly specifies data to be stored to the target cache line. Execution of CS_Release_store instruction 1000 by execution units 124 generates a corresponding store request including at least a request type distinct from that of other unconditional store requests, a store target address determined from address field 1004, and the store data specified by data field 1006.

FIG. 10B depicts an exemplary program including a lock release sequence including a CS_Release_store instruction in accordance with the third embodiment. In this example, multithreaded program 1010 includes a lock release sequence 1012 that follows an unillustrated critical section as discussed above with reference to FIG. 2B. Lock release sequence 1012 includes a load immediate instruction 1014 that loads a register r2 with a value of '0' signifying a released state of the lock. Load immediate instruction 1014 is followed in program order by a CS_Release_store instruction 1016 as discussed above with reference to FIG. 10A. When executed, CS_Release_store instruction 1016 causes execution units 124 to generate a corresponding store request that will release the lock (by updating the lock variable to '0') and update the coherence state of the target cache line containing the lock variable to M. As a result, acquisition of write authority for the cache line containing the lock by another processing unit 102 executing a lock acquisition sequence 214 is facilitated.

FIG. 10C is a high level logical flowchart of an exemplary method of updating a coherence state of a target cache line of a store request in accordance with the third embodiment. The depicted method can be performed, for example, at block 668 of FIG. 6B, where the coherence state of a target cache line of a store request is selectively updated in accordance with the desired coherence update policy for stores. In this case, the coherence update policy that is implemented is selected based on the request type of a store request.

The process of FIG. 10C begins at block 1020 and then proceeds to block 1022, which illustrates the RC machine 142 servicing a store request determining whether or not the request type of the store-type request indicates a CS_Release_store that is intended to set the coherence state of the target cache line to the M state. If so, RC machine 142 sets the coherence state for the target cache line to M in the local L2 directory 141 (block 1024). Thereafter, the process ends at block 1030. However, in response to a determination at block 1022 that the request type of the store-type request is a not CS_Release_store but is instead a regular unconditional store request, the RC machine 142 also determines at block 1026 whether the existing coherence state of the target cache line is Mu or M in the local L2 directory 141. If not (e.g., the coherence state is Me, T, S or I), the process passes to block 1024, which has been described. If, however, RC machine 142 determines at block 1026 that the existing coherence state of the target cache line is Mu or M, RC machine 142 refrains from updating the coherence state of the target cache line in response to the storage update in accordance with the default coherence state update policy for stores (block 1028). Thereafter, the process of FIG. 10C ends at block 1030.

With reference now to FIG. 11, there is illustrated a block diagram of an exemplary design flow 1100 used for example, in semiconductor IC logic design, simulation, test, layout, and manufacture. Design flow 1100 includes processes, machines and/or mechanisms for processing design structures or devices to generate logically or otherwise functionally equivalent representations of the design structures and/or devices described above and shown herein. The design structures processed and/or generated by design flow 1100 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 1100 may vary depending on the type of representation being designed. For example, a design flow 1100 for building an application specific IC (ASIC) may differ from a design flow 1100 for designing a standard component or from a design flow 1100 for instantiating the design into a programmable array, for example a programmable gate array (PGA) or a field programmable gate array (FPGA) offered by Altera® Inc. or Xilinx® Inc.

FIG. 11 illustrates multiple such design structures including an input design structure 1020 that is preferably processed by a design process 1110. Design structure 1120 may be a logical simulation design structure generated and processed by design process 1110 to produce a logically equivalent functional representation of a hardware device. Design structure 1120 may also or alternatively comprise data and/or program instructions that when processed by design process 1110, generate a functional representation of the physical structure of a hardware device. Whether representing functional and/or structural design features, design structure 1120 may be generated using electronic computer-aided design (ECAD) such as implemented by a core developer/designer. When encoded on a machine-readable data transmission, gate array, or storage medium, design structure 1120 may be accessed and processed by one or more hardware and/or software modules within design process 1110 to simulate or otherwise functionally represent an electronic component, circuit, electronic or logic module, apparatus, device, or system such as those shown herein. As such, design structure 1120 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 1110 preferably employs and incorporates hardware and/or software modules for synthesizing, translating, or otherwise processing a design/simulation functional equivalent of the components, circuits, devices, or logic structures shown herein to generate a netlist 1180 which may contain design structures such as design structure 1120. Netlist 1180 may comprise, for example, compiled or otherwise processed data structures representing a list of wires, discrete components, logic gates, control circuits, I/O devices, models, etc. that describes the connections to other elements and circuits in an integrated circuit design. Netlist 1180 may be synthesized using an iterative process in which netlist 1180 is resynthesized one or more times depending on design specifications and parameters for the device. As with other design structure types described herein, netlist 1180 may be recorded on a machine-readable storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, or buffer space.

Design process 1110 may include hardware and software modules for processing a variety of input data structure types including netlist 1180. Such data structure types may reside, for example, within library elements 1130 and include a set of commonly used elements, circuits, and devices, including models, layouts, and symbolic representations, for a given manufacturing technology (e.g., different technology nodes, 32 nm, 45 nm, 110 nm, etc.). The data structure types may further include design specifications 1140, characterization data 1150, verification data 1160, design rules 1190, and test data files 1185 which may include input test patterns, output test results, and other testing information. Design process 1110 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 1110 without deviating from the scope and spirit of the invention. Design process 1110 may also include modules for performing standard circuit design processes such as timing analysis, verification, design rule checking, place and route operations, etc.

Design process 1110 employs and incorporates logic and physical design tools such as HDL compilers and simulation model build tools to process design structure 1120 together with some or all of the depicted supporting data structures along with any additional mechanical design or data (if applicable), to generate a second design structure 1190. Design structure 1190 resides on a storage medium or programmable gate array in a data format used for the exchange of data of mechanical devices and structures (e.g., information stored in a IGES, DXF, Parasolid XT, JT, DRG, or any other suitable format for storing or rendering such mechanical design structures). Similar to design structure 1120, design structure 1190 preferably comprises one or more files, data structures, or other computer-encoded data or instructions that reside on transmission or data storage media and that when processed by an ECAD system generate a logically or otherwise functionally equivalent form of one or more of the embodiments of the invention shown herein. In one embodiment, design structure 1190 may comprise a compiled, executable HDL simulation model that functionally simulates the devices shown herein.

Design structure 1190 may also employ a data format used for the exchange of layout data of integrated circuits and/or symbolic data format (e.g., information stored in a GDSII (GDS2), GL1, OASIS, map files, or any other suitable format for storing such design data structures). Design structure 1190 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown herein. Design structure 1190 may then proceed to a stage 1195 where, for example, design structure 1190: proceeds to tape-out, is released to manufacturing, is released to a mask house, is sent to another design house, is sent back to the customer, etc.

As has been described, in at least one embodiment, a processor core executes a first instruction indicating a first coherence state update policy that biases the cache memory to retain write authority, thereafter executes a second instruction indicating a second coherence state update policy that biases the cache memory to transfer write authority, and executes a store instruction following the first instruction in program order to generate a store request. A cache memory stores the cache line in association with a coherence state field set to a first modified coherence state. In response to the store request, the cache memory updates data of the cache line. If the store instruction is executed prior to the second instruction, the cache memory refrains from updating the coherence state field, but if the store instruction is executed after the second instruction, the cache memory updates the coherence state field from the first modified coherence state to a second modified coherence state.

While various embodiments have been particularly shown and described, it will be understood by those skilled in the art that various changes in form and detail may be made therein without departing from the spirit and scope of the appended claims and these alternate implementations all fall within the scope of the appended claims. It should also be appreciated that features of multiple of the disclosed embodiments can also be utilized in combination.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although a particular embodiment of a memory hierarchy has been described in which L1 and L2 caches are incorporated within a processing unit, those skilled in the art will appreciate that a greater or lesser number of levels of cache hierarchy may be employed. Further, these levels of cache hierarchy may include in-line or lookaside caches and may include one or more levels of off-chip cache. Further, the level of cache hierarchy at which coherency is determined may differ from that discussed with reference to the described embodiments.

Further, although aspects have been described with respect to a computer system executing program code that directs the functions of the present invention, it should be understood that present invention may alternatively be implemented as a program product including a computer-readable storage device storing program code that can be processed by a data processing system. The computer-readable storage device can include volatile or non-volatile memory, an optical or magnetic disk, or the like. However, as employed herein, a "storage device" is specifically defined to include only statutory articles of manufacture and to exclude signal media per se, transitory propagating signals per se, and energy per se.

The program product may include data and/or instructions that when executed or otherwise processed on a data processing system generate a logically, structurally, or otherwise functionally equivalent representation (including a simulation model) of hardware components, circuits, devices, or systems disclosed herein. Such data and/or instructions may include hardware-description language (HDL) design entities or other data structures conforming to and/or compatible with lower-level HDL design languages such as Verilog and VHDL, and/or higher level design languages such as C or C++. Furthermore, the data and/or instructions may also employ a data format used for the exchange of layout data of integrated circuits and/or symbolic data format (e.g. information stored in a GDSII (GDS2), GL1, OASIS, map files, or any other suitable format for storing such design data structures).

What is claimed is:

1. A method of data processing in a data processing system including a processor core and a cache memory, said method comprising:
   in the cache memory, storing a cache line in association with a coherence state field set to a first modified coherence state among a plurality of modified coherence states;
   the processor core executing a first instruction that indicates a first coherence state update policy that biases the cache memory to retain write authority for the cache line;
   the processor core thereafter executing a second instruction that indicates a second coherence state update policy that biases the cache memory to transfer write authority for the cache line;
   the processor core generating a store request by executing a store instruction following the first instruction in program order, the store request including store data;
   responsive to the store request, the cache memory:
      updating data of the cache line utilizing the store data;
      in response to the store instruction being executed prior to the second instruction, refraining from updating the coherence state field from the first modified coherence state based on the first coherence state update policy; and
      in response to the store instruction being executed after the second instruction, updating the coherence state field from the first modified coherence state to a second modified coherence state among the plurality of modified coherence states based on the second coherence state update policy.

2. The method of claim 1, and further comprising recording, in a register of the processor core, which of the first coherence state update policy and the second coherence state update policy is implemented.

3. The method of claim 1, wherein the second instruction is an instruction demarking an end of a critical section of a program.

4. The method of claim 3, wherein the first instruction is an instruction demarking a beginning of the critical section of the program.

5. The method of claim 3, wherein the first instruction is a store-conditional instruction that conditionally updates a lock for the critical section.

6. The method of claim 1, and further comprising:
the cache memory, responsive to snooping a read request for the cache line with the coherence state field set to the first modified coherence state, updating the coherence state field to a shared coherence state in which the cache memory retains write authority for the cache line.

7. The method of claim 6, and further comprising:
the cache memory, responsive to snooping a read request for the cache line with the coherence state field set to the second modified coherence state, updating the coherence state field to an invalid coherence state.

8. A processing unit for a data processing system, said processing unit comprising:
a processor core including one or more execution units configured to execute a first instruction that indicates a first coherence state update policy that biases the cache memory to retain write authority for a cache line, thereafter execute a second instruction that indicates a second coherence state update policy that biases the cache memory to transfer write authority for the cache line, and execute a store instruction following the first instruction in program order to generate a store request including store data;
a cache memory, coupled to the processor core, that stores the cache line in association with a coherence state field set to a first modified coherence state among a plurality of modified coherence states, wherein the cache memory, responsive to the store request, is configured to:
update data of the cache line utilizing the store data;
in response to the store instruction being executed prior to the second instruction, refrain from updating the coherence state field from the first modified coherence state based on the first coherence state update policy; and
in response to the store instruction being executed after the second instruction, update the coherence state field from the first modified coherence state to a second modified coherence state among the plurality of modified coherence states based on the second coherence state update policy.

9. The processing unit of claim 8, wherein the processor core includes a register that records which of the first coherence state update policy and the second coherence state update policy is implemented.

10. The processing unit of claim 8, wherein the second instruction is an instruction demarking an end of a critical section of a program.

11. The processing unit of claim 10, wherein the first instruction is an instruction demarking a beginning of the critical section of the program.

12. The processing unit of claim 10, wherein the first instruction is a store-conditional instruction that conditionally updates a lock for the critical section.

13. The processing unit of claim 8, wherein the cache memory is configured to, responsive to snooping a read request for the cache line with the coherence state field set to the first modified coherence state, update the coherence state field to a shared coherence state in which the cache memory retains write authority for the cache line.

14. The processing unit of claim 13, wherein the cache memory is configured to, responsive to snooping a read request for the cache line with the coherence state field set to the second modified coherence state, update the coherence state field to an invalid coherence state.

15. A data processing system, comprising:
multiple processing units, including the processing unit of claim 8;
a shared memory; and
a system interconnect communicatively coupling the shared memory and the multiple processing units.

16. A design structure tangibly embodied in a machine-readable storage device for designing, manufacturing, or testing an integrated circuit, the design structure comprising:
a processing unit for a data processing system, said processing unit including:
a processor core including one or more execution units configured to execute a first instruction that indicates a first coherence state update policy that biases the cache memory to retain write authority for a cache line, thereafter execute a second instruction that indicates a second coherence state update policy that biases the cache memory to transfer write authority for the cache line, and execute a store instruction following the first instruction in program order to generate a store request including store data;
a cache memory, coupled to the cache memory, that stores the cache line in association with a coherence state field set to a first modified coherence state among a plurality of modified coherence states, wherein the cache memory, responsive to the store request, is configured to:
update data of the cache line utilizing the store data;
in response to the store instruction being executed prior to the second instruction, refrain from updating the coherence state field from the first modified coherence state based on the first coherence state update policy; and
in response to the store instruction being executed after the second instruction, update the coherence state field from the first modified coherence state to a second modified coherence state among the plurality of modified coherence states based on the second coherence state update policy.

17. The design structure of claim 6, wherein the second instruction is an instruction demarking an end of a critical section of a program.

18. The design structure of claim 17, wherein the first instruction is an instruction demarking a beginning of the critical section of the program.

19. The design structure of claim 17, wherein the first instruction is a store-conditional instruction that conditionally updates a lock for the critical section.

20. The design structure of claim 16, wherein the cache memory is configured to: responsive to snooping a read request for the cache line with the coherence state field set to the first modified coherence state, update the coherence state field to a shared coherence state in which the cache memory retains write authority for the cache line; and
responsive to snooping a read request for the cache line with the coherence state field set to the second modified coherence state, update the coherence state field to an invalid coherence state.

* * * * *